United States Patent
Ishii et al.

(10) Patent No.: US 9,429,834 B2
(45) Date of Patent: Aug. 30, 2016

(54) THREE-DIMENSIONAL IMAGING DEVICE

(75) Inventors: Yasunori Ishii, Osaka (JP); Masao Hiramoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 539 days.

(21) Appl. No.: 13/511,029

(22) PCT Filed: Aug. 19, 2011

(86) PCT No.: PCT/JP2011/004626
§ 371 (c)(1), (2), (4) Date: May 21, 2012

(87) PCT Pub. No.: WO2012/039093
PCT Pub. Date: Mar. 29, 2012

(65) Prior Publication Data
US 2012/0293634 A1 Nov. 22, 2012

(30) Foreign Application Priority Data
Sep. 24, 2010 (JP) ................. 2010-213225

(51) Int. Cl.
*H04N 13/02* (2006.01)
*G03B 35/10* (2006.01)
(Continued)

(52) U.S. Cl.
CPC ............ *G03B 35/10* (2013.01); *G06T 7/0065* (2013.01); *H04N 13/02* (2013.01); *H04N 13/0214* (2013.01); *G06T 2207/20088* (2013.01); *H04N 2013/0081* (2013.01)

(58) Field of Classification Search
CPC .......... H04N 13/0214; H04N 13/025; H04N 13/0257
See application file for complete search history.

(56) References Cited

U.S. PATENT DOCUMENTS 6,781,716 B1 * 8/2004 Yoda ............... H04N 1/6058
358/1.9
6,977,674 B2 * 12/2005 Seo ............... H04N 13/0257
348/207.99

(Continued)

FOREIGN PATENT DOCUMENTS

JP 02-171737 A 7/1990
JP 2002-513145 T 5/2002

(Continued)

OTHER PUBLICATIONS

Co-pending U.S. Appl. No. 13/517,066, filed Jun. 19, 2012 (copy of application provided).

(Continued)

*Primary Examiner* — Christopher Findley
(74) *Attorney, Agent, or Firm* — Renner, Otto, Boisselle & Sklar, LLP

(57) ABSTRACT

This 3D image capture device includes an image capturing section 100 and a signal processing section 200. The image capturing section 100 includes a light-transmitting section 2 with first, second and third transmitting areas that have mutually different transmission wavelength ranges, a solid-state image sensor 1 that is arranged to receive the light transmitted through the light-transmitting section, and an optical system 3 that produces an image on an imaging area of the solid-state image sensor. The signal processing section 200 includes an image generating section 7 that generates three image signals, representing the quantities of light rays that have been incident on the first, second and third transmitting areas, based on the output signal of the solid-state image sensor 1, and a parallax estimating section 40 that estimates parallax based on the three image signals.

6 Claims, 12 Drawing Sheets

(51) Int. Cl.
*G06T 7/00* (2006.01)
*H04N 13/00* (2006.01)

(56) References Cited

U.S. PATENT DOCUMENTS

| | | | |
|---|---|---|---|
| 7,916,180 B2 * | 3/2011 | Olsen | H01L 27/14645 348/218.1 |
| 2002/0171740 A1 | 11/2002 | Seo | |
| 2003/0169359 A1 | 9/2003 | Merrill et al. | |
| 2009/0284627 A1 * | 11/2009 | Bando | G06K 9/00201 348/273 |
| 2010/0128152 A1 | 5/2010 | Hayasaka et al. | |
| 2011/0050941 A1 | 3/2011 | Hiramoto et al. | |

FOREIGN PATENT DOCUMENTS

| | | |
|---|---|---|
| JP | 2002-344999 A1 | 11/2002 |
| JP | 2003-134533 A | 5/2003 |
| JP | 2009-276294 A | 11/2009 |
| JP | 2010-154493 A | 7/2010 |
| WO | 2010/058545 A1 | 5/2010 |

OTHER PUBLICATIONS

International Search Report for corresponding International Application No. PCT/JP2011/004626 mailed Nov. 15, 2011.
Omer et al., "Color Lines: Image Specific Color Representation", In Proc. CVPR, vol. 2, p. 946-953, 2004.

* cited by examiner (a)

(b)

(c)

(a)

(b)

(a)

(b)

THREE-DIMENSIONAL IMAGING DEVICE

TECHNICAL FIELD

The present invention relates to a single-lens 3D image capturing technology for generating multiple images with parallax.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in a solid-state image sensor has been further reduced these days thanks to rapid development of semiconductor device processing technologies, thus getting an even greater number of pixels and drivers integrated together in a solid-state image sensor. As a result, the resolution of an image sensor has lately increased rapidly from around one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax by using a single camera have been researched and developed. For example, Patent Document No. 1 discloses a technique for obtaining two images with parallax at the same time using color filters. FIG. 16 schematically illustrates an image capturing system that adopts such a technique. The image capturing system that uses that technique includes a lens 3, a lens diaphragm 19, a light beam confining plate 20 with two color filters 20*a* and 20*b* that have mutually different transmission wavelength ranges, and a photosensitive film 21. In this case, the color filters 20*a* and 20*b* may be filters that transmit red- and blue-based light rays, respectively.

In such an arrangement, the incoming light passes through the lens 3, the lens diaphragm 19 and the light beam confining plate 20 and produces an image on the photosensitive film. In the meantime, only red- and blue-based light rays are respectively transmitted through the two color filters 20*a* and 20*b* of the light beam confining plate 20. As a result, a magenta-based color image is produced on the photosensitive film by the light rays that have been transmitted through the two color filters. In this case, since the color filters 20*a* and 20*b* are arranged at mutually different positions, the image produced on the photosensitive film comes to have parallax. Thus, if a photograph is developed with the photosensitive film and viewed with a pair of glasses, in which red and blue films are attached to its right- and left-eye lenses, the viewer can view an image with depth. In this manner, according to the technique disclosed in Patent Document No. 1, images with parallax can be produced using the two color filters.

According to the technique disclosed in Patent Document No. 1, the light rays are imaged on the photosensitive film, thereby producing images with parallax there. Meanwhile, Patent Document No. 2 discloses a technique for producing images with parallax by transforming incoming light into electrical signals. FIG. 17 schematically illustrates a light beam confining plate according to such a technique. Specifically according to that technique, a light beam confining plate 22, which has a red ray transmitting R area 22R, a green ray transmitting G area 22G and a blue ray transmitting B area 22B, is arranged on a plane that intersects with the optical axis of the imaging optical system at right angles. And by getting the light rays that have been transmitted through those areas received by a color image sensor that has red-, green- and blue-ray-receiving R, G and B pixels, an image is generated based on the light rays that have been transmitted through those areas.

Patent Document No. 3 also discloses a technique for obtaining images with parallax using a similar configuration to the one illustrated in FIG. 17. FIG. 18 schematically illustrates a light beam confining plate as disclosed in Patent Document No. 3. According to that technique, by making the incoming light pass through R, G and B areas 23R, 23G and 23B of the light beam confining plate 23, images with parallax can also be produced.

According to the techniques disclosed in Patent Documents Nos. 1 to 3 mentioned above, images with parallax can be produced by arranging RGB color filters on a light beam confining plate. However, since the light beam confining plate is used, the percentage of the incoming light that can be used eventually decreases. In addition, to increase the effect of parallax, the RGB color filters should be arranged at distant positions and should have decreased areas. In that case, however, the percentage of the incoming light that can be used eventually further decreases.

Unlike these techniques, Patent Document No. 4 discloses a technique for obtaining multiple images with parallax and a normal image that is free from the light quantity problem by using a diaphragm in which RGB color filters are arranged. According to that technique, when the diaphragm is closed, only the light rays that have been transmitted through the RGB color filters are received. On the other hand, when the diaphragm is opened, the RGB color filter areas are outside of the optical path, and therefore, the incoming light can be received entirely. Consequently, images with parallax can be obtained when the diaphragm is closed and a normal image that uses the incoming light highly efficiently can be obtained when the diaphragm is opened.

CITATION LIST

Patent Literature

Patent Document No. 1: Japanese Laid-Open Patent Publication No. 2-171737
Patent Document No. 2: Japanese Laid-Open Patent Publication No. 2002-344999
Patent Document No. 3: Japanese Laid-Open Patent Publication No. 2009-276294

Patent Document No. 4: Japanese Laid-Open Patent Publication No. 2003-134533

Non-Patent Literature

Non-Patent Document No. 1: "Color Lines: Image Specific Color Representation", Ido Omer and Michael Werman, In Proc. CVPR, vol. 2, 946-953.

SUMMARY OF INVENTION

Technical Problem

According to any of these known techniques, multiple images with parallax can be certainly obtained, but the quantity of the light received by the image sensor is smaller than usual because color filters are used for a light beam confining plate. In order to receive a sufficient quantity of incoming light, a normal image that uses the incoming light highly efficiently could be obtained by using some mechanism that removes the color filters from the optical path by mechanical driving. Or a decrease in the quantity of the incoming light that can be used could also be minimized by providing only two color filters (i.e., a minimum required number of color filters) for the light beam confining plate. If the former method is adopted, however, the overall size of the device increases too much and the manufacturing cost becomes too high. According to the latter method, the light rays that are transmitted through the two color filters fall within mutually different wavelength ranges, and therefore, the two images obtained will have mutually different color depths. Consequently, it is difficult to calculate the parallax by block matching or any other similar technique for searching for corresponding points based on the degree of color depth.

The present invention provides a 3D image capturing technique for generating multiple images with parallax without mechanical driving but with the incoming light used highly efficiently.

Solution to Problem

A 3D image capture device according to the present invention includes: a light-transmitting section with first, second and third transmitting areas that have mutually different transmission wavelength ranges; a solid-state image sensor that includes a photosensitive cell array and that is arranged so as to receive the light that has been transmitted through the light-transmitting section; an optical system that produces an image on an imaging area of the solid-state image sensor; and a signal processing section that processes the output signal of the solid-state image sensor. At least one of the first, second and third transmitting areas is made of either a member that transmits a light ray that falls within one of cyan, yellow and magenta wavelength ranges or a transparent member. The photosensitive cell array is made up of a number of unit blocks, each of which includes R, G and B sensing cells that respectively output first, second and third photoelectrically converted signals representing the quantities of light falling within red, green and blue wavelength ranges, respectively. The signal processing section includes an image generating section and a parallax estimating section. The image generating section performs processing, including addition and subtraction, on the first, second and third photoelectrically converted signals, thereby generating three color mixture signals representing the respective quantities of light rays that have been incident on the first, second and third transmitting areas and eventually generating three images with parallax. The parallax estimating section estimates the parallax between the three images.

In one embodiment, the signal processing section further includes a distance information generating section that generates information about a distance to a subject based on the parallax that has been estimated by the parallax estimating section.

In one embodiment, the parallax estimating section includes: a pixel block extracting section that selects an estimate of the magnitude of parallax from among multiple candidates with respect to each pixel of the three images and that extracts, based on the estimate, three pixel blocks of the same size, of which the on-image positions have shifted from each other, from the three images; a degree of shift determining section that determines how much the distribution of a set of points on a three-dimensional color space, which is defined by the sets of pixel values of the three pixel blocks, has shifted from a line; and a magnitude of parallax defining section that defines the estimate, of which the degree of shift from the line that has been determined by the degree of shift determining section turns out to be the minimum, to be the magnitude of parallax at each said pixel.

In one embodiment, the first transmitting area is made of a member that transmits a light ray falling within one of the cyan, yellow and magenta wavelength ranges, the second transmitting area is made of a member that transmits a light ray falling within another one of the cyan, yellow and magenta wavelength ranges, and the third transmitting area is made of a transparent member.

In one embodiment, the first, second and third transmitting areas are made of members that transmit light rays falling within the cyan, yellow and magenta wavelength ranges, respectively.

In one embodiment, the light-transmitting section further has a fourth transmitting area, which is made of either a member that transmits a light ray falling within a red, green or blue wavelength range or a transparent member.

A signal processing method according to the present invention is a method for processing the output signal of an image capture device that includes: a light-transmitting section with first, second and third transmitting areas that have mutually different transmission wavelength ranges; a solid-state image sensor that includes a photosensitive cell array and that is arranged so as to receive the light that has been transmitted through the light-transmitting section; and an optical system that produces an image on an imaging area of the solid-state image sensor. At least one of the first, second and third transmitting areas is made of either a member that transmits a light ray that falls within one of cyan, yellow and magenta wavelength ranges or a transparent member. The photosensitive cell array is made up of a number of unit blocks, each of which includes R, G and B sensing cells that respectively output first, second and third photoelectrically converted signals representing the quantities of light falling within red, green and blue wavelength ranges, respectively. The signal processing method of the present invention includes the steps of: performing processing, including addition and subtraction, on the first, second and third photoelectrically converted signals, thereby generating three color mixture signals representing the respective quantities of light rays that have been incident on the first, second and third transmitting areas and eventually generating three images with parallax; and estimating the parallax between the three images.

The signal processing method of the present invention may further include the step of generating information about a distance to a subject based on the parallax that has been estimated.

In one embodiment, the step of estimating includes the steps of: selecting an estimate of the magnitude of parallax from among multiple candidates with respect to each pixel of the three images and extracting, based on the estimate, three pixel blocks of the same size, of which the on-image positions have shifted from each other, from the three images; determining how much the distribution of a set of points on a three-dimensional color space, which is defined by the sets of pixel values of the three pixel blocks, has shifted from a line; and defining the estimate, of which the degree of shift from the line that has been determined turns out to be the minimum, to be the magnitude of parallax at each said pixel.

Advantageous Effects of Invention

According to the present invention, multiple images with parallax can be generated by using the incoming light very efficiently. On top of that, since the magnitude of parallax can be estimated even when a chromatic color subject is shot, the magnitude of parallax can be estimated and an image can be shot with high optical efficiency at the same time.

DESCRIPTION OF EMBODIMENTS

Figure 1:
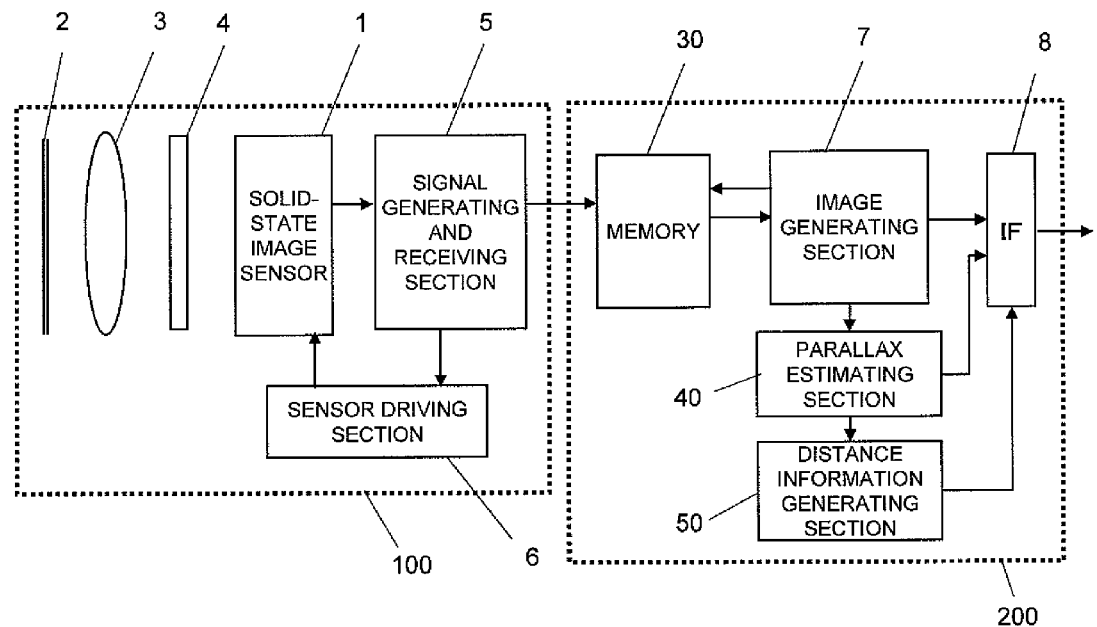
[FIG. 1] A block diagram illustrating an overall configuration for an image capture device according to a first embodiment.

Hereinafter, embodiments of the present invention will be described with reference to the accompanying drawings. In the following description, any element shown in multiple drawings and having substantially the same function will be identified by the same reference numeral. It should be noted that a signal or information representing an image will be sometimes referred to herein as just an "image".

Embodiment 1

FIG. 1 is a block diagram illustrating an overall configuration for a 3D image capture device (which will be simply referred to herein as an "image capture device") as a first embodiment of the present invention. The image capture device of this embodiment is a digital electronic camera and includes an image capturing section 100 and a signal processing section 200 that receives a signal from the image capturing section 100 and outputs a signal representing an image (i.e., an image signal). The image capture device of this embodiment may have the capability of shooting a moving picture, not just still pictures.

The image capturing section 100 includes an image sensor 1 with a number of photosensitive cells that are arranged on its imaging area, a light-transmitting plate (light-transmitting section) 2, which has three transmitting areas that have mutually different transmission wavelength ranges and which transmits the incoming light, an optical lens for producing an image on the imaging area of the image sensor 1, and an infrared cut filter 4. The image capturing section 100 further includes a signal generating and receiving section 5, which not only generates a fundamental signal to drive the image sensor 1 but also receives the output signal of the image sensor 1 and sends it to the signal processing section 200, and a sensor driving section 6 for driving the image sensor 1 in accordance with the fundamental signal generated by the signal generating and receiving section 5. The image sensor 1 is typically a CCD or CMOS sensor, which may be fabricated by known semiconductor device processing technologies. The signal generating and receiving section 5 and the sensor driving section 30 may be implemented as an LSI such as a CCD driver.

The signal processing section 200 includes an image generating section 7 for generating an image signal by processing the signal supplied from the image capturing section 100, a memory 30 for storing various kinds of data for use to generate the image signal, and an interface (I/F) section 8 for sending out the image signal thus generated to an external device. The signal processing section 200 further includes a parallax estimating section 40 for estimating parallax between the multiple images that have been generated by the image generating section 7 and a distance information generating section 50 for generating information about the distance to the subject based on the parallax estimated. The image generating section 7, the parallax estimating section 40 and the distance information generating section 50 may be a combination of a hardware component such as a known digital signal processor (DSP) and a software program for use to perform image processing involving the image signal generation, the parallax estimation and the distance information generation to be described later. The memory 30 may be a DRAM, for example. And the memory 30 not only stores the signal supplied from the image capturing section 100 but also temporarily retains the image data that has been generated by the image generating section 7 or compressed image data. These image data are then output to either a storage medium or a display section (neither is shown) by way of the interface section 8.

The image capture device of this preferred embodiment actually further includes an electronic shutter, a viewfinder, a power supply (or battery), a flashlight and other known components. However, the description thereof will be omitted herein because none of them are essential components that would make it difficult to understand how the present invention works unless they were described in detail.

Next, the configuration of the image capturing section 100 will be described in further detail with reference to FIGS. 2 through 4.

Figure 2:
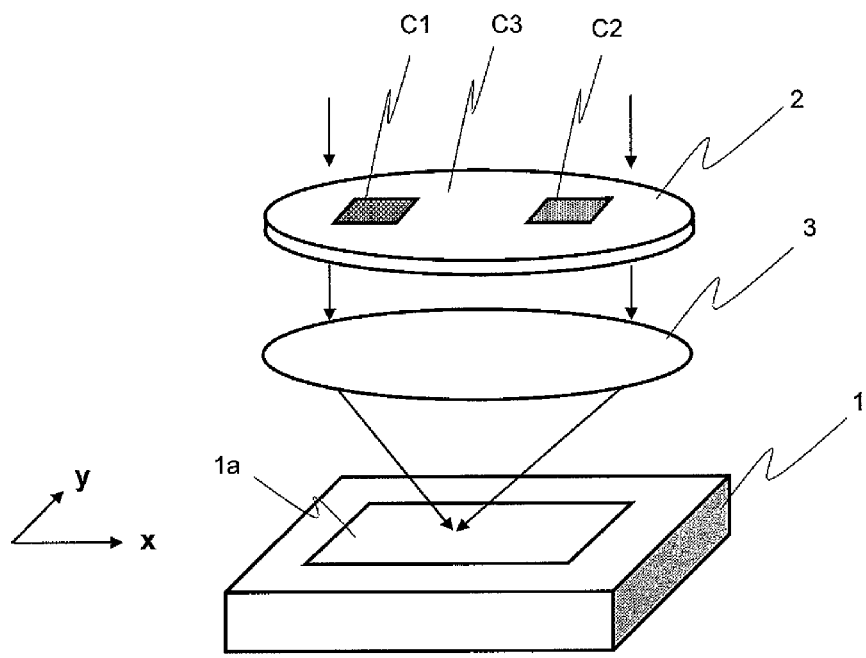
[FIG. 2] A schematic representation generally illustrating the relative arrangement of a light-transmitting plate, an optical system and an image sensor according to the first embodiment.

FIG. 2 schematically illustrates the relative arrangement of the light-transmitting plate 2, the lens 3 and the image sensor 1 in the image capturing section 100. It should be noted that illustration of the other elements is omitted in FIG. 2. The light-transmitting plate 2 has three transmitting areas C1, C2 and C3 that have mutually different transmission wavelength ranges and transmits the incoming light. The lens 3 is a known lens and condenses the light that has been transmitted through the light-transmitting plate 2, thereby imaging the light on the imaging area 1a of the image sensor 1. In the following description, on a plane parallel to the imaging area 1a, the direction that points from the area C1 toward the area C2 will be referred to herein as "x direction" and the direction that is defined perpendicularly to the x direction will be referred to herein as "y direction".

It should be noted that the arrangement of the respective members shown in FIG. 2 is only an example of the present invention. And the present invention is in no way limited to that specific embodiment. Alternatively, as long as an image can be produced on the imaging area 1a, the lens 3 may be arranged more distant from the image sensor 1 than the light-transmitting plate 2 is. Still alternatively, the lens 3 may be a lens unit consisting of multiple lenses and the light-transmitting plate 2 may be interposed between those lenses 3. Furthermore, the lens 3 and the light-transmitting plate 2 do not always have to be two independent members but may also be implemented as a single optical element. What is more, the light-transmitting plate 2 and the imaging area of the image sensor 1 do not always have to be arranged parallel to each other. For example, by arranging an optical element that reflects light such as a mirror or a prism between the light-transmitting plate 2 and the image sensor 1, the light-transmitting plate 2 and the imaging area of the image sensor may be arranged on two planes that intersect with each other.

Figure 3:
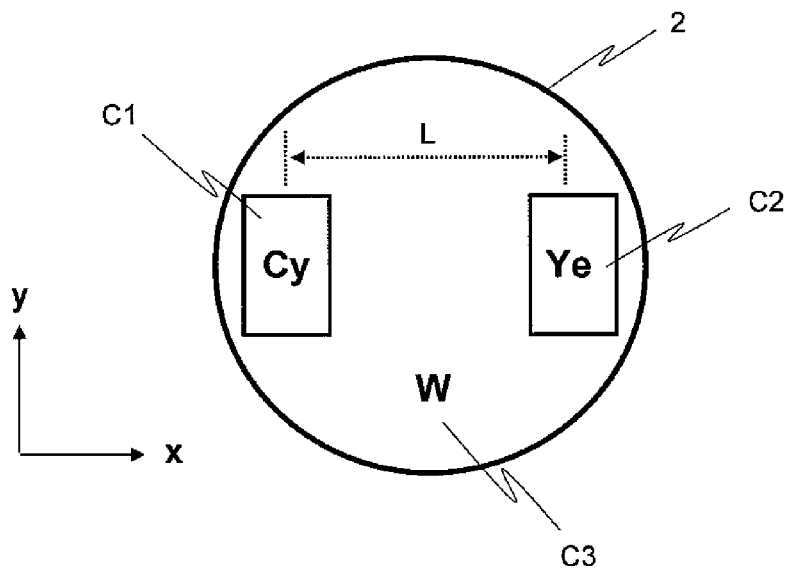
[FIG. 3] A view illustrating an arrangement of transmitting areas on a light-transmitting plate according to the first embodiment.

FIG. 3 is a front view of the light-transmitting plate 2 of this embodiment. The light-transmitting plate 2, as well as the lens 3, has a circular shape in this embodiment but may also have any other shape. In the area C1, arranged is a color filter that transmits a light ray falling within the cyan (Cy) wavelength range (i.e., G and B wavelength ranges). Such a filter will be referred to herein as a "Cy filter". In the area C2, arranged is a color filter that transmits a light ray falling within the yellow (Ye) wavelength range (i.e., R and G wavelength ranges). Such a filter will be referred to herein as a "Ye filter".

It should be noted that as long as these areas C1 and C2 of this embodiment are configured so as to transmit only a light ray falling within the Cr wavelength range and only a light ray falling within the Ye wavelength range, respectively, and not to transmit a light ray falling within any other wavelength range, the areas C1 and C2 do not have to be color filters but may be any other kind of members. For example, each of these areas C1 and C2 may be a dichroic mirror or any other optical element that transmits a light ray falling within a particular wavelength range and reflects a light ray falling within any other wavelength range. In this example, the areas C1 and C2 are spaced apart from each other in the x direction. The distance L between the areas C1 and C2 is determined by the size of the lens 3 so that the image obtained will have appropriate parallax, and may be set to be within the range of several millimeters to several centimeters, for example. Meanwhile, the other area C3 of the light-transmitting plate 2 is a transparent area, which is made of a transparent member that transmits visible radiation included in white light (W) and falling within the entire wavelength range. The transparent member may be made of any material as long as the transparent member can transmit light with high transmittance. In this embodiment, the areas C1 and C2 are designed to have the same planar area and the area C3 is designed to have a larger planar area than the areas C1 and C2.

On the imaging area 1a of the image sensor 1 shown in FIG. 2, there is an array of photosensitive cells that are arranged two-dimensionally and an array of color filters that are arranged to face those photosensitive cells in the array. The array of photosensitive cells and the array of color filters consist of multiple unit blocks. And each unit block includes four photosensitive cells and four associated color filters that face them. Each of those photosensitive cells is typically a photodiode, which performs photoelectric conversion and outputs an electrical signal representing the quantity of the light received (which will be referred to herein as a "photoelectrically converted signal" or a "pixel signal"). On the other hand, each color filter may be made of a known pigment and is designed so as to selectively transmit a light ray falling within a particular wavelength range.

Figure 4:
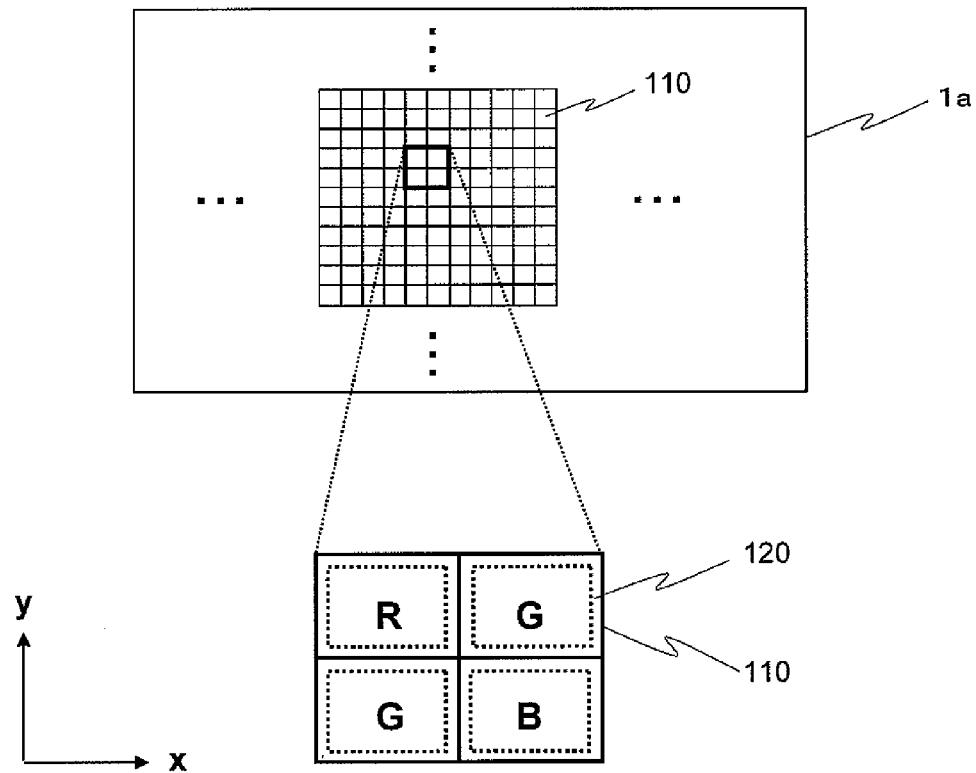
[FIG. 4] A view illustrating an arrangement of pixels on an image sensor according to the first embodiment.

FIG. 4 schematically illustrates a part of the array of photosensitive cells and a part of the array of color filters. A lot of photosensitive cells 120 and color filters 110 that face them one to one are arranged in columns and rows on the imaging area 1a. In this embodiment, four photosensitive cells 120 that are arranged close to each other form one unit block. In each unit block, a color filter that transmits a light ray falling within the red (R) wavelength range (i.e., an R filter) is arranged at the row 1, column 1 position, color filters that transmit a light ray falling within the green (G) wavelength range (i.e., G filters) are arranged at the row 1, column 2 position and at the row 2, column 1 position, and a color filter that transmits a light ray falling within the blue (B) wavelength range (i.e., a B filter) is arranged at the row 2, column 2 position. As can be seen, the arrangement of the color filters 110 according to this embodiment is a known Bayer arrangement consisting basically of two rows and two columns. However, the photosensitive cells 120 and the color filters 110 do not have to have the Bayer arrangement but may also have any other known arrangement.

According to such an arrangement, the light that has entered this image capture device during an exposure process passes through the light-transmitting plate 2, the lens 3, the infrared cut filter 4 and the color filters 110 and then is incident on the photosensitive cells 120. Each of those photosensitive cells 120 receives a light ray that has been transmitted through the area C1, C2 or C3 of the light-transmitting plate 2 and then through its associated color filter, and outputs a photoelectrically converted signal representing the quantity (or the intensity) of the light received. The photoelectrically converted signal that has been output from each photosensitive cell is sent to the signal processing section 200 by way of the signal generating and receiving section 5. In the signal processing section 200, the image generating section 7 generates a right-eye image, a left-eye image, and a color image based on the signals supplied from the image capturing section 100.

Although the image sensor 1 of this embodiment makes color separation using the array of color filters described above, an image sensor that uses no array of color filters may also be used according to the present invention. For example, an image sensor with a triple well structure as disclosed in PCT International Application Japanese National Phase Patent Publication 2002-513145 may also be used. Thus, as long as each unit block includes R, G and B sensing cells that sense light rays falling within the red, green and blue wavelength ranges, respectively, any image sensor may be used.

Also, in the embodiment described above, each photosensitive cell is supposed to sense a light ray falling within the red, green or blue wavelength range. However, the sensing wavelength range of each photosensitive cell may be further subdivided. For example, the red wavelength range $\lambda r$ may be subdivided into three wavelength ranges $\lambda r1$, $\lambda r2$ and $\lambda r3$ and three photosensitive cells associated with these wavelength ranges $\lambda r1$, $\lambda r2$, and $\lambda r3$, may be provided. In that case, the sum of the pixel signals provided by the three photosensitive cells may be processed as a signal representing a red ray.

Hereinafter, the photoelectrically converted signals supplied from those photosensitive cells will be described. First of all, signals representing the intensities of light rays that have been incident on the areas C1, C2 and C3 of the light-transmitting plate 2 will be identified herein by Ci1, Ci2 and Ci3, respectively, with a subscript "i" added. Also, the spectral transmittance of the transparent area C3 of the light-transmitting plate 2, the lens 3 and the infrared cut filter 4 combined will be identified herein by Tw. And the spectral transmittances of the Cy and Ye filters will be identified herein by Tcy and Tye, respectively. In the same way, the spectral transmittances of the R, G and B color filters will be identified herein by Tr, Tg and Tb, respectively. In this case, Tw, Tcy, Tye, Tr, Tg and Tb are functions that depend on the wavelength $\lambda$ of the incoming light. Also, signals representing the intensities of light rays that have been transmitted through the R, G and B color filters and then received by photosensitive cells right under those color filters will be identified herein by Rs, Gs and Bs, respectively, with a subscript "s" added. Furthermore, the integration operation of the spectral transmittances in the visible radiation wavelength range will be identified herein by the sign $\Sigma$. For example, an integration operation $\int Tw Tcy Tr d\lambda$ with respect to the wavelength $\lambda$ will be identified herein by $\Sigma\, TwTcyTr$. In this case, the integration is supposed to be performed in the entire visible radiation wavelength range. Then, Rs is proportional to the sum of Ci1 $\Sigma$ TwTcyTr, Ci2 $\Sigma$ TwTyeTr and Ci3 $\Sigma$ TwTr. Likewise, Gs is proportional to the sum of Ci1 $\Sigma$ TwTcyTg, Ci2 $\Sigma$ TwTyeTg and Ci3 $\Sigma$ TwTg. And Bs is proportional to the sum of Ci1 $\Sigma$ TwTcyTb, Ci2 $\Sigma$ TwTyeTb and Ci3 $\Sigma$ TwTb. Supposing the constant of proportionality with respect to these relations is one, Rs, Gs and Bs can be represented by the following Equations (1), (2) and (3), respectively:

$$Rs = Ci1\Sigma TwTcyTr + Ci2\Sigma TwTyeTr + Ci3\Sigma TwTr \quad (1)$$

$$Gs = Ci1\Sigma TwTcyTg + Ci2\Sigma TwTyeTg + Ci3\Sigma TwTg \quad (2)$$

$$Bs = Ci1\Sigma TwTcyTb + Ci2\Sigma TwTyeTb + Ci3\Sigma TwTb \quad (3)$$

If $\Sigma$ TwTcyTr, $\Sigma$ TwTyeTr and $\Sigma$ TwTr of Equation (1) are represented by Mx11, Mx12 and Mx13, respectively, and if $\Sigma$ TwTcyTg, $\Sigma$ TwTyeTg and $\Sigma$ TwTg of Equation (2) are represented by Mx21, Mx22 and Mx23, respectively, and if $\Sigma$ TwTcyTb, $\Sigma$ TwTyeTb and $\Sigma$ TwTb of Equation (3) are represented by Mx31, Mx32 and Mx33, respectively, then the relation between Rs, Gs and Bs and Ci1, Ci2 and Ci3 can be given as a matrix by the following Equation (4):

$$\begin{pmatrix} Rs \\ Gs \\ Bs \end{pmatrix} = \begin{pmatrix} Mx11 & Mx12 & Mx13 \\ Mx21 & Mx22 & Mx23 \\ Mx31 & Mx32 & Mx33 \end{pmatrix} \begin{pmatrix} Ci1 \\ Ci2 \\ Ci3 \end{pmatrix} \quad (4)$$

Supposing the respective elements of an inverse matrix, which is obtained by inverting the matrix consisting of the elements Mx11 through Mx33 as represented by Equation (4), are identified by iM11 through iM33, respectively, Equation (4) can be modified into the following Equation (5). That is to say, the signals representing the intensities of the light rays that have been incident on the areas C1, C2 and C3 can be represented by using the photoelectrically converted signals Rs, Gs and Bs:

$$\begin{pmatrix} Ci1 \\ Ci2 \\ Ci3 \end{pmatrix} = \begin{pmatrix} iM11 & iM12 & iM13 \\ iM21 & iM22 & iM23 \\ iM31 & iM32 & iM33 \end{pmatrix} \begin{pmatrix} Rs \\ Gs \\ Bs \end{pmatrix} \quad (5)$$

The image generating section 7 (see FIG. 1) carries out a signal arithmetic operation based on this Equation (5), thereby generating signals Ci1, Ci2 and Ci3 on a unit block basis. These signals Ci1, Ci2 and Ci3 that have been generated on a unit block basis represent three images that have been produced by the light rays that were incident on the areas C1, C2 and C3, respectively. Among other things, the images represented by the signals Ci1 and Ci2 correspond to the images obtained by viewing the subject from the areas C1 and C2 that are spaced apart from each other in the x direction, and therefore, can be handled as a left-eye image and a right-eye image, respectively. That is to say, the two images represented by the signals Ci1 and Ci2 have parallax corresponding to the distance between the two areas C1 and C2. Consequently, information about the depth of the subject can be obtained from these images.

The image signals Ci1, Ci2 and Ci3 that have been obtained through the processing described above are represented by photoelectrically converted signals Rs, Gs and Bs but correspond to grayscale images (i.e., monochrome images), not color images. In order to obtain a color image instead of a grayscale image, normal color processing using a Bayer arrangement may be carried out on the photoelectrically converted signals thus obtained, instead of the signal arithmetic processing described above. In that case, some loss of the incoming light and a variation in color temperature may be caused by the Cy and Ye filters of the light-transmitting plate 2. However, as these color filters have high optical transmittance, the loss of the incoming light can be smaller than in the related art. Also, even an overall color shift, if any, can be coped with by adjusting the white balance. Thus, the image capture device of this embodiment can obtain a good color image by using the incoming light highly efficiently.

Optionally, instead of performing normal color processing using a Bayer arrangement on the respective photoelectrically converted signals in order to obtain a color image, color information may also be obtained by using only the Ci3 term of Equation (4). That is to say, even by obtaining Ci3 by Equation (5) and then regarding Mx13×Ci3, Mx23×Ci3 and Mx33×Ci3 as representing the quantities of R, G and B light rays, respectively, a color image can also be obtained.

A parallax signal could be generated and distance information could be calculated by using the image signals Ci1 and Ci2 that have been obtained in this manner. And once the distance information has been obtained by calculation, that information can be used to generate a parallax signal for a color image, generate an image as viewed from an arbitrary viewpoint, separate the foreground from the background by cropping, and for other purposes.

In general, to calculate the distance information, correspondence between each pixel of the image signal Ci1 and its associated pixel of the image signal Ci2 needs to be obtained. To obtain the correspondence between those pixels means searching the image signal Ci2 for a pixel corresponding to a particular pixel in the image signal Ci1 that represents a three-dimensional point p of a subject. Suppose a subject represented by a pixel with coordinates (x1, y1) in the image signal Ci1 is represented by a pixel with coordinates (x2, y2) in the image signal Ci2. In that case, if the distance between an associated pair of pixels (which is the distance between the coordinates (x1, y1) and the coordinates (x2, y2) and which may be a Euclidean distance or an urban area distance) is obtained, then the distance from the camera to the subject can be calculated. Such a distance between an associated pair of pixels will be referred to herein as the "magnitude of parallax" in this description of embodiments.

Figure 5:
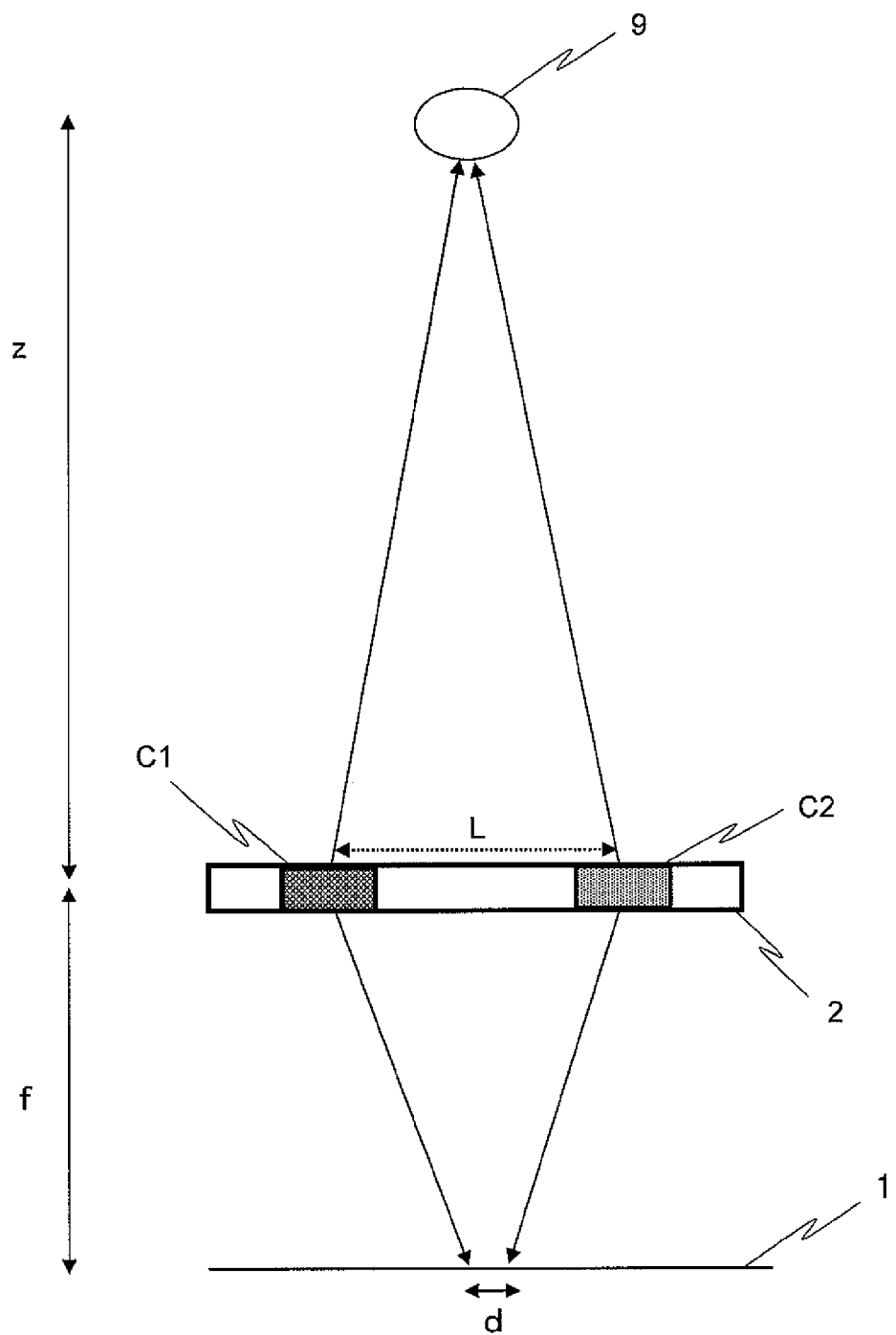
[FIG. 5] Illustrates a relation between the magnitude of parallax d and the distance z according to the first embodiment.

Hereinafter, it will be described with reference to FIG. 5 on what principle the distance from the camera to a subject is measured. FIG. 5 is a schematic representation illustrating a relative arrangement of the light-transmitting plate 2, a subject 9 and the image sensor 1. In FIG. 5, the center of the lens 3 (not shown) is supposed to be located at the center of the light-transmitting plate 2. Suppose in the example illustrated in FIG. 5, the focal length of the lens 3 is f, the distance from the light-transmitting plate 2 to the subject 9 is z, the magnitude of parallax produced when the subject 9 is shot with the camera is d, and the distance between the respective centers of the areas C1 and C2 is L. In that case, based on the general binocular stereo principle, the distance z can be calculated by the following Equation (6):

$$z = fL/d \quad (6)$$

The focal length f and the distance L between the areas C1 and C2 can be obtained in advance. That is why if the magnitude of parallax d is known, then the distance z can be obtained. As a result, information about the distance to the subject can be obtained.

According to a known method for obtaining the magnitude of parallax between a feature point in the image signal Ci1 and its corresponding feature point in the image signal Ci2, the coordinates of that corresponding point are obtained based on the degree of similarity between their grayscale values. For example, there is a method in which a given image is divided into a number of small blocks to calculate either the sum of absolute differences (SAD) or the sum of squared differences (SSD) between the blocks. In any case, the difference that has been calculated on a pair of blocks with a high degree of similarity becomes small. That is why by finding a combination of blocks that has the smallest difference, the pair of corresponding points between the signals Ci1 and Ci2 can be obtained. As a result, the magnitude of parallax d can be calculated.

However, as those corresponding points between the image signals Ci1 and Ci2 usually have different grayscale values, the magnitude of parallax d calculated by such a method will have error. The image signals Ci1, Ci2 and Ci3 are signals representing the respective intensities of light rays that have come from the subject and have been incident on the transmitting areas C1, C2 and C3, respectively. That is why by calculating the respective intensities of the light rays that have been transmitted through the transmitting areas C1 and C2, the intensities of the cyan ray (i.e., green and blue rays) and the yellow ray (i.e., red and green rays) that have been incident on those areas can be obtained. The signals representing the intensities of the light rays that have been transmitted through the transmitting areas C1 and C2 are identified by Ci1 Σ TwTcy and Ci2 Σ TwTye, respectively. However, the transmitting areas C1 and C2 have mutually different transmission wavelength ranges. That is why if the subject has a chromatic color, their corresponding points also have mutually different grayscale values as for the signals Ci1 Σ TwTcy and Ci2 Σ TwTye with parallax.

Figure 6:
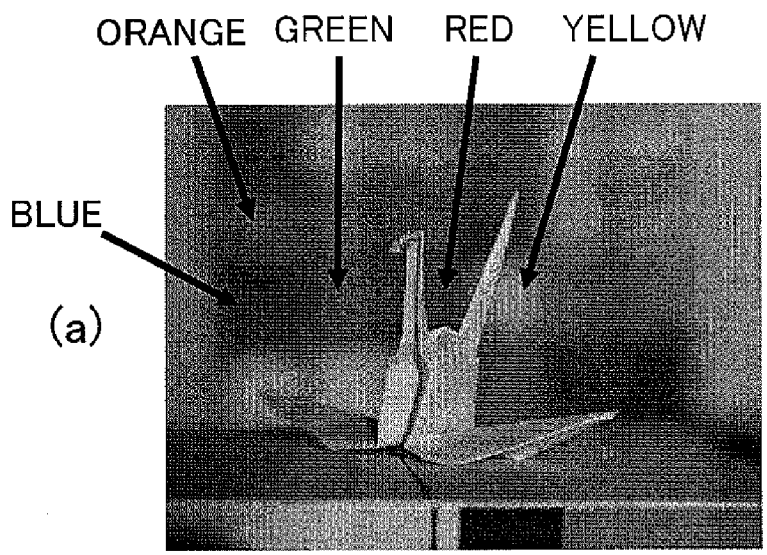
[FIG. 6] Shows examples of a color image, a Ci1 image and a Ci2 image according to the first embodiment.
Figure 6:
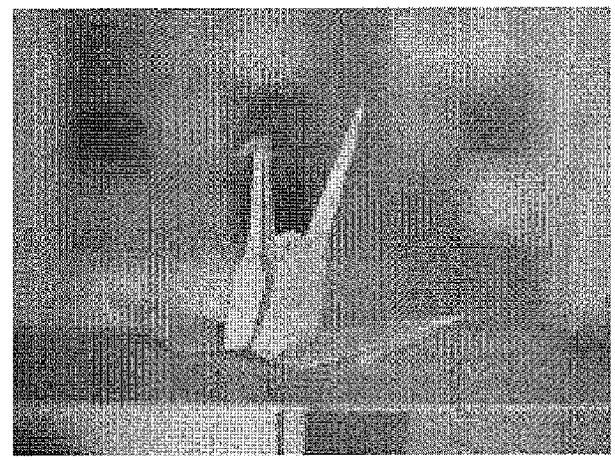
Figure 6:
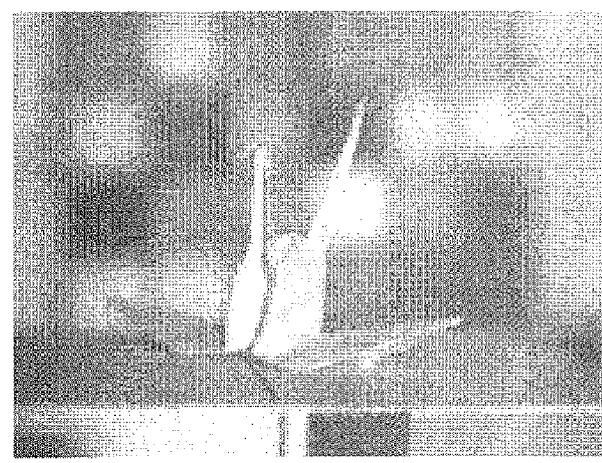

FIGS. 6(*a*), 6(*b*) and 6(*c*) are photographs showing an image shot (which is a color image), an image represented by Ci1 Σ TwTcy and an image represented by Ci2 Σ TwTye, respectively. On the background of each of these images, a color chart is put to compare their colors. The arrows shown in FIG. 6(*a*) indicate what colors some sections of the color chart represent. For example, if the subject is a blue subject, the signal Ci1 Σ TwTcy representing the intensity of a light ray that has been transmitted through the Cy filter C1 has a larger grayscale value than the signal Ci2 Σ TwTye representing the intensity of a light ray that has been transmitted through the Ye filter C2. As a result, the blue section shown in FIG. 6(*b*) becomes brighter than the blue section shown in FIG. 6(*c*). Conversely, the yellow section shown in FIG. 6(*b*) becomes darker than the yellow section shown in FIG. 6(*c*). In this manner, if the subject has a chromatic color, the grayscale values are different between Ci1 Σ TwTcy and Ci2 Σ TwTye. For that reason, the known matching method based on the degree of similarity between the grayscale values cannot be adopted.

Patent Document No. 3 discloses a method for obtaining the magnitude of parallax using three images with parallax that has been produced by light rays transmitted through R, G and B color filters, which are arranged on a diaphragm. This method takes advantage of a property of an ordinary natural image in which no parallax is produced between R, G and B components and in which the distribution of RGB values becomes locally linear in the (R, G, B) three-dimensional space (which will be referred to herein as a "three-dimensional color space"). That is to say, if no parallax has been produced between R, G and B images, pixel values will have a linear distribution in the (R, G, B) three-dimensional space. On the other hand, if parallax has been produced, the distribution does not become a linear one. That is why supposing the magnitude of parallax is d, by obtaining a d value representing the minimum deviation of the (R, G, B) distribution from the line when the d value is varied within a particular range, the parallax can be estimated. Such a model on which a natural image where no parallax is produced between color components has a locally linear three-dimensional color space distribution will be referred to herein as a "color lines model", the details of which are disclosed in Non-Patent Document No. 1, for example.

As in the method disclosed in Patent Document No. 3, the image capture device of this embodiment also obtains the parallax between the images by the color lines model. In this embodiment, however, the respective pixel signals Rs, Gs and Bs are not directly associated with a particular transmitting area unlike Patent Document No. 3 but the signal components generated by the light rays that have come from those transmitting areas C1, C2 and C3 superpose one upon the other. That is why three signals representing the intensities of the light rays that have been incident on C1, C2 and C3 and having mutually different color components need to be generated.

According to this embodiment, two types of complementary color filters Cy and Ye are used as color filter for the transmitting areas of the light-transmitting plate 2. Thus, first of all, if no parallax is produced between the respective color components, the pixel values (Cy, Mg, Ye) of each image comes to have a linear distribution even in the three-dimensional space of the complementary colors (i.e., Cy, magenta (Mg) and Ye) as in the known method that uses R, G and B.

To make a set of pixel values that has a linear distribution when the primary colors are used have a linear distribution again even when the complementary colors are used, the relation between the primary colors and the complementary colors need to be a linear one. In this case, the relation between the primary colors R, G, B and their complementary colors Cy, Mg and Ye is represented by the following Equation (7):

$$(R,G,B) = (\text{bit} - Cy, \text{bit} - Mg, \text{bit} - Ye) \quad (7)$$

Figure 7:
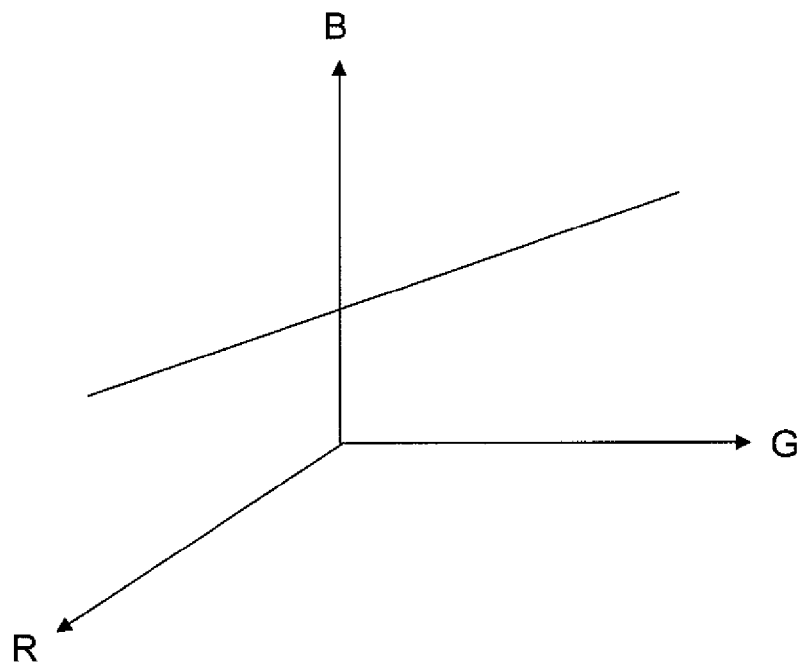
[FIGS. 7] (a) shows an example of a line in an RGB color space and (b) shows an example of a line in a CyYeMg color space.
Figure 7:
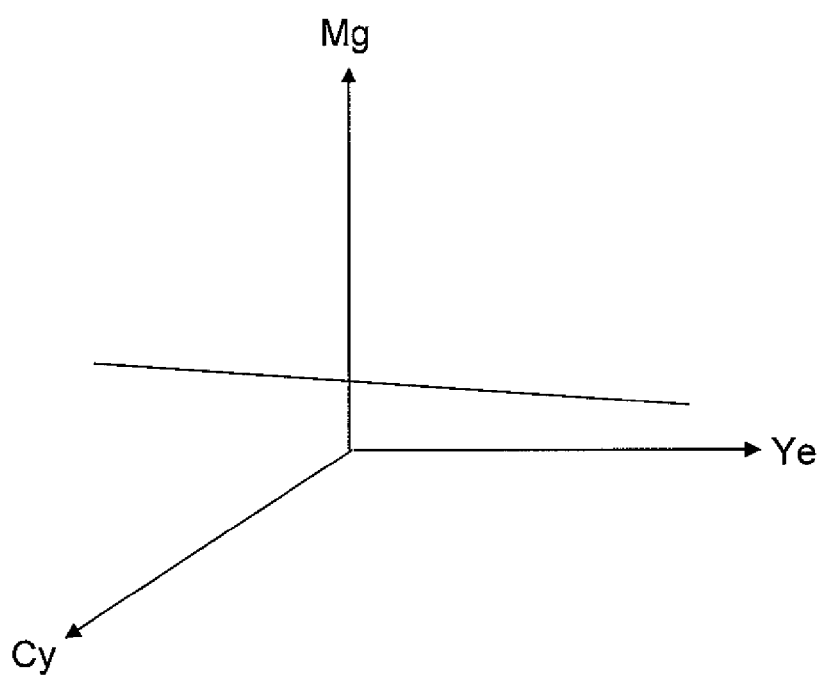

The constant bit is the maximum value of a one pixel signal and may be 255 if the given image is an 8-bit image. As can be seen from Equation (7), linear conversion can be carried out between the complementary and primary colors, and therefore, the local linear relation is also satisfied even in the three-dimensional space of the complementary colors. FIG. 7 illustrates an example in which a linear relation satisfied when the primary colors are used is also satisfied when the complementary colors are used. Specifically, FIG. 7(a) shows a line in the R, G, B three-dimensional color space and FIG. 7(b) shows its corresponding line in the Cy, Mg, Ye three-dimensional color space. As can be seen, the parallax can also be estimated effectively by the color lines model even when the complementary colors are used.

Consequently, the magnitude of parallax can be estimated based on three complementary color images with the parallax. Hereinafter, it will be described how to generate three image signal Cy, Mg and Ye with parallax based on RGB pixel signals that have been obtained by capturing an image using the light-transmitting plate 2 that is made up of a Cy area, a Ye area and a transparent area. After that, it will be described how to estimate the magnitude of parallax between those images and how to obtain information about the distance to the subject by calculation.

Figure 8:
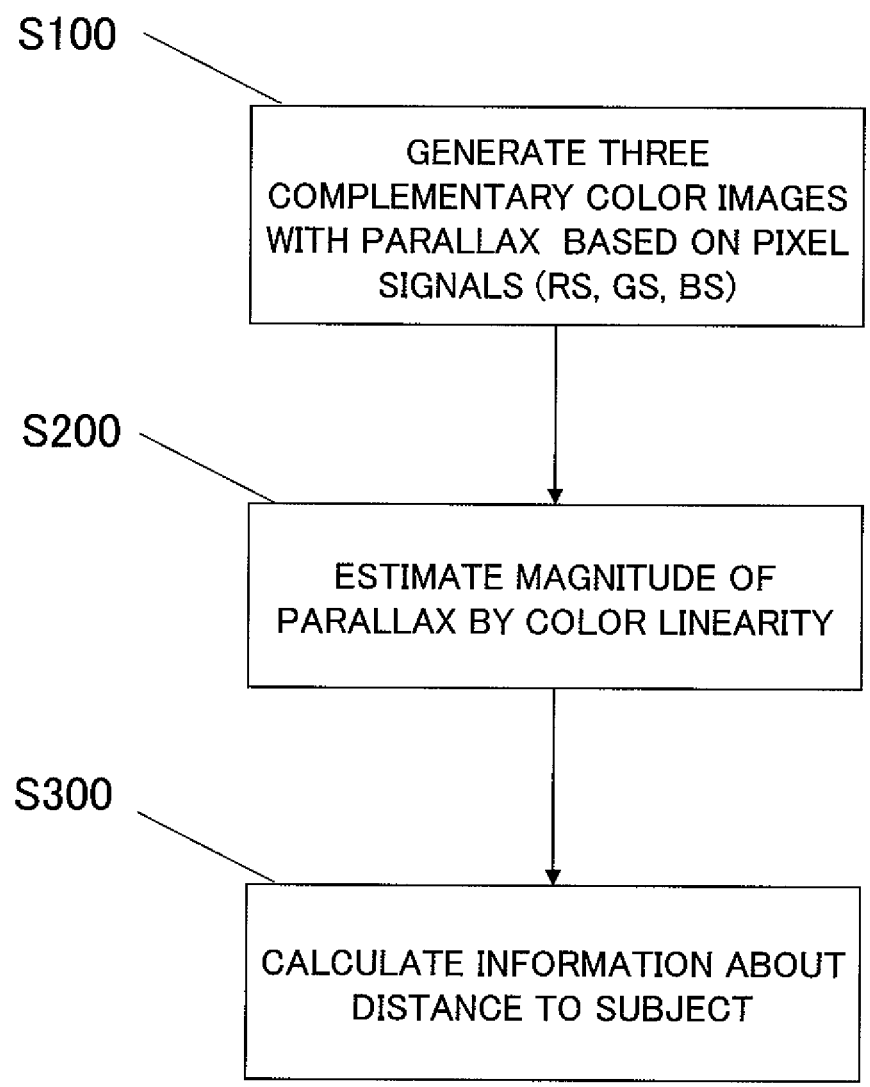
[FIG. 8] A flowchart showing the procedure of signal processing according to the first embodiment.

FIG. 8 is a flowchart showing the general procedure of processing to be carried out by the signal processing section 200. When an image is shot, the image generating section 7 generates three complementary color images with parallax (which will be referred to herein as "parallax complementary color images") based on pixel signals Rs, Gs and Bs that have been obtained by shooting (in Step S100). Next, in Step S200, the parallax estimating section 40 estimates, by the color linearity in the three-dimensional color space, the magnitude of parallax between the three parallax complementary color images. Finally, in Step S300, the distance information generating section 50 calculates information about the distance to the subject, which is represented by each pixel, by Equation (6) based on the magnitude of parallax that has been estimated.

Hereinafter, the respective processing steps will be described in detail.

First of all, it will be described how to generate three complementary color image signals Cs, Ys and Ms with parallax based on pixel signals Rs, Gs and Bs that have been obtained by capturing an image using the light-transmitting plate 2 including Cy, Ye and transparent areas. The image generating section 7 divides each of Equations (1), (2) and (3) by Tw, thereby obtaining signals Rt, Gt and Bt represented by the following Equations (8), (9) and (10):

$$Rt = Rs/Tw = Ci1\Sigma TcyTr + Ci2\Sigma TyeTr + Ci3\Sigma Tr \quad (8)$$

$$Gt = Gs/Tw = Ci1\Sigma TcyTg + Ci2\Sigma TyeTg + Ci3\Sigma Tg \quad (9)$$

$$Bt = Bs/Tw = Ci1\Sigma TcyTb + Ci2\Sigma TyeTb + Ci3\Sigma Tb \quad (10)$$

As Cy has G and B wavelength ranges, Gt+Bt−Rt represented by the following Equation (11) is defined according to this embodiment to be an image signal Cs representing a Cy component:

$$\begin{aligned}
Cs &= Gt + Bt - Rt \\
&= Ci1\left(\sum TcyTg + \sum TcyTb - \sum TcyTr\right) + \\
&\quad Ci2\left(\sum TyeTg + \sum TyeTb - \sum TyeTr\right) + \\
&\quad Ci3\left(\sum Tg + \sum Tb - \sum Tr\right)
\end{aligned} \quad (11)$$

In the same way, the signals given by the following Equations (12) and (13) are defined to be image signals Ms and Ys representing Mg and Ye components, respectively:

$$\begin{aligned}
Ms &= Rt + Bt - Gt \\
&= Ci1\left(\sum TcyTr + \sum TcyTb - \sum TcyTg\right) + \\
&\quad Ci2\left(\sum TyeTr + \sum TyeTb - \sum TyeTg\right) + \\
&\quad Ci3\left(\sum Tr + \sum Tb - \sum Tg\right)
\end{aligned} \quad (12)$$

$$\begin{aligned}
Ys &= Rt + Gt - Bt \\
&= Ci1\left(\sum TcyTr + \sum TcyTg - \sum TcyTb\right) + \\
&\quad Ci2\left(\sum TyeTr + \sum TyeTg - \sum TyeTb\right) + \\
&\quad Ci3\left(\sum Tr + \sum Tg - \sum Tb\right)
\end{aligned} \quad (13)$$

In this case, as the R wavelength range is hardly covered by the transmission wavelength range of the Cy filter and as the B wavelength range is hardly covered by the transmission wavelength range of the Ye filter, $\Sigma TcyTr \approx \Sigma TyeTb \approx 0$ is satisfied. Meanwhile, suppose the transmission wavelength range of the Cy filter covers substantially equally the G and B wavelength ranges and the transmission wavelength range of the Ye filter covers substantially equally the G and R wavelength ranges. Then, $\Sigma$ TcyTg$\approx\Sigma$ TcyTb and $\Sigma$ TyeTg$\approx\Sigma$TyeTr are satisfied. Furthermore, the integrated value of the spectral transmittances of the color filters that face the respective pixels of the image sensor 1 is supposed to be the same for every color component. That is to say, $\Sigma$ Tr$\approx\Sigma$ Tg$\approx\Sigma$ Tg is supposed to be satisfied. On these suppositions, Equations (11), (12) and (13) are rewritten into the following Equations (14), (15) and (16), respectively:

$$Cs = Gt + Bt - Rt \quad (14)$$
$$= Ci1\left(\sum TcyTg + \sum TcyTb\right) + Ci3\sum Tg$$

$$Ms = Rt + Bt - Gt \quad (15)$$
$$= Ci3\sum Tr$$

$$Ys = Rt + Gt - Bt \quad (16)$$
$$= Ci2\left(\sum TyeTr + \sum TyeTg\right) + Ci3\sum Tg$$

Equation (14) is obtained by removing the Ci2 term from Equation (11). The first term of Equation (14) represents the quantity of the light transmitted through the Cy area and depends only on Ci1, and the second term thereof represents the quantity of the light transmitted through the transparent area Ci3 and then the G filter. In this case, the G ray falling within the G wavelength range is a light ray transmitted through all of the Cy, Ye and transparent areas. That is to say, the second term represents the quantity obtained by multiplying the quantity of the G ray transmitted through every transmitting area by the ratio of the planar area of the area C3 to that of the area C2, and therefore, can be regarded as an offset associated with brightness. However, even if there is such an offset, the three-dimensional space distribution of the complementary color system will just shift as a whole, which does not affect calculation of the linearity.

Likewise, Equation (15) is obtained by removing the Ci1 and Ci2 components from Equation (12). And Equation (16) is obtained by removing the Ci1 component from Equation (13). As can be seen, by performing the arithmetic processing represented by Equations (14) to (16) on the RGB pixel signals, the grayscale values of the three complementary color images with parallax can be obtained.

Hereinafter, it will be described how to estimate the magnitude of parallax.

First of all, the magnitude of parallax of Cy and Ye images with respect to a Mg image is supposed to be d pixels. Then, supposing the values (pixel values) of the Cy, Ye and Mg images are Icy (x−d, y), Iye (x+d, y) and Img (x, y) f respectively, it is necessary to prove, by using the linearity of complementary colors in a local area, that those values point to the same point in the real world.

The magnitude of parallax d may be obtained in the following manner by using the linearity in a local area with respect to a certain pixel (x, y). Specifically, the magnitude of parallax d can be obtained by determining whether or not local pixel values are distributed linearly. A set of pixel values in an area surrounding a pixel (x, y) is defined by the following Equation (17):

$$P=\{Icy(s-d,t), Img(s,t), Iye(s+d,t)|(s,t) \text{ is a neighboring pixel surrounding } (x,y)\} \quad (17)$$

Figure 9:
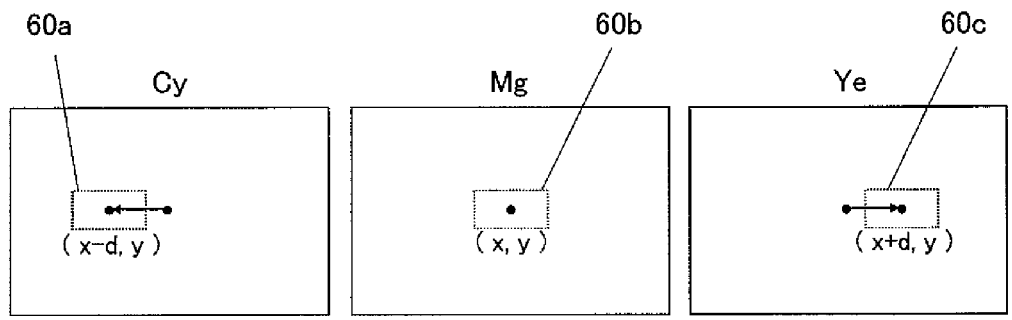
[FIG. 9] Illustrates pixel blocks according to the first embodiment.

FIG. 9 illustrates pixel blocks 60a, 60b and 60c that are located in respective areas surrounding the corresponding points of Cy, Mg and Ye images. In this example, the corresponding point in the Mg image is supposed to have coordinates (x, y). Since the magnitude of parallax is d pixels, the corresponding point in the Cy image has shifted horizontally by −d pixels with respect to its counterpart in the Mg image. In the same way, the corresponding point in the Ye image has shifted horizontally by +d pixels with respect to its counterpart in the Mg image. Consequently, the pixel block 60b surrounding the point (x, y) in the Mg image corresponds to the pixel block 60a surrounding the point (x−d, y) in the Cy image and to the pixel block 60c surrounding the point (x+d, y) in the Ye image.

A line is applied to the distribution obtained by Equation (17) and the mean square error with respect to the applied line is regarded as an error Er (x, y, d) with respect to the color lines model. To obtain the line, the principal axis that defines the spread direction of the distribution needs to be calculated based on the three-dimensional space distribution of complementary colors. For that purpose, first of all, the covariance matrix S of P is obtained. The principal axis of the set P is an eigenvector with respect to the maximum eigenvalue $\lambda$max of the covariance matrix. If the distribution is a linear one, the sum of the variances in the respective local areas of the Cy, Mg and Ye images becomes equal to $\lambda$, max. That is to say, the error Er (x, y, d) is represented by the following Equation (18):

$$Er(x,y,d)=S00+S11+S22-\lambda\text{max} \quad (18)$$

where S00, S11 and S22 are the values calculated by the following Equations (19), (20) and (21), and are the variances of Cy, Mg and Ye, respectively:

$$S00=\Sigma(Icy(s-d,t)-\text{avg}(Icy))2/N \quad (19)$$

$$S11=\Sigma(Img(s,t)-\text{avg}(Img))2/N \quad (20)$$

$$S22=\Sigma(Iye(s+d,t)-\text{avg}(Iye))2/N \quad (21)$$

where N is the number of pixels included in the set P and avg (Icy), avg (Img) and avg (Iye) are the averages of the respective components that are calculated by the following Equations (22), (23) and (24), respectively:

$$\text{avg}(Icy)=\Sigma Icy(s-d,t)/N \quad (22)$$

$$\text{avg}(Img)=\Sigma Img(s,t)/N \quad (23)$$

$$\text{avg}(Iye)=\Sigma Iye(s+d,t)/N \quad (24)$$

This means that the greater the error Er (x, y, d) represented by Equation (18), the higher the chances the supposed magnitude of parallax d is wrong.

Figure 10:
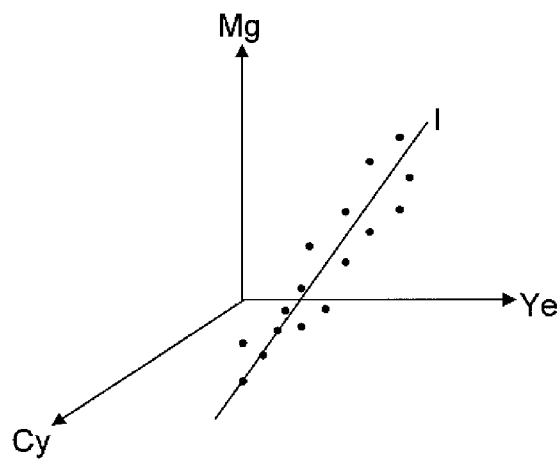
[FIGS. 10] (a) shows an exemplary distribution of a set of points in a three-dimensional color space in a situation where the estimated parallax is relatively close to the true magnitude of parallax and (b) shows an exemplary distribution of a set of points in a three-dimensional color space in a situation where the estimated parallax has shifted from the true magnitude of parallax.
Figure 10:
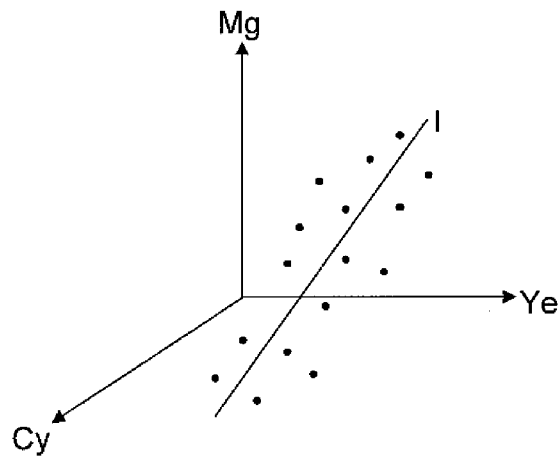

FIG. 10(a) illustrates how a set of points may be distributed in a three-dimensional color space when the magnitude of the error Er is relatively small. On the other hand, FIG. 10(b) illustrates how a set of points may be distributed in the three-dimensional color space when the magnitude of the error Er is relatively large. In the example illustrated in FIGS. 10(a) and 10(b), the distribution shown in FIG. 10(a) is closer to the line I than the distribution shown in FIG. 10(b) is. Consequently, a decision is made that the estimate of parallax d shown in FIG. 10(a) is the more accurate estimate.

Taking these results into consideration, the estimate of parallax d may be changed within a particular range (e.g., d may be changed one by one from −20 through 20) to find d that minimizes Er (x, y, d), and that d may be defined to be the magnitude of parallax at the coordinates (x, y) By performing these processing steps on each pixel, the parallax between the three parallax complementary color images can be calculated.

Hereinafter, the configuration of the parallax estimating section 40 and the procedure of its processing will be described in detail.

Figure 11:
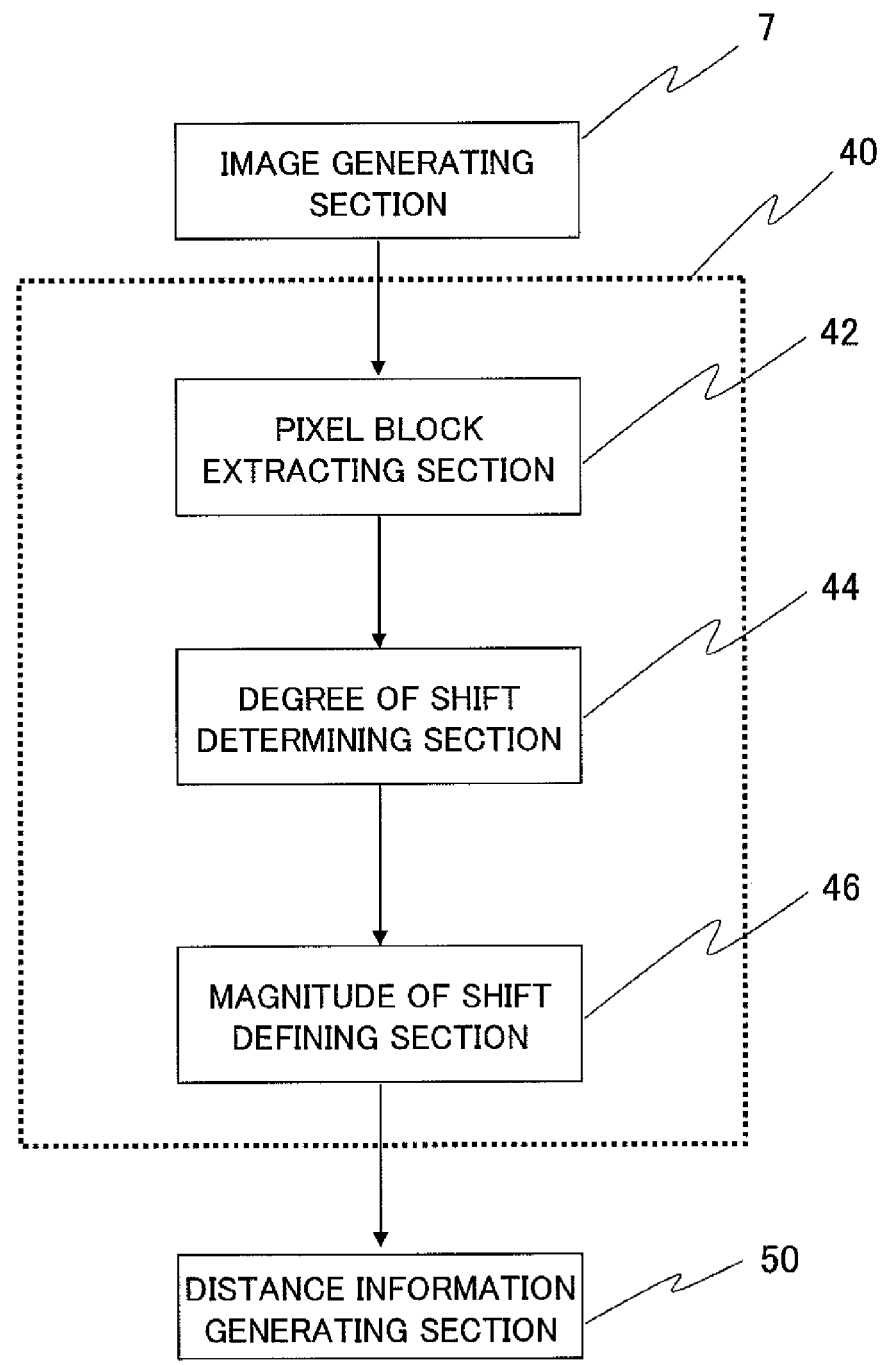
[FIG. 11] A block diagram illustrating a configuration for a parallax estimating section according to the first embodiment.

FIG. 11 is a block diagram illustrating a configuration for the parallax estimating section 40. The parallax estimating section 40 includes a pixel block extracting section 42 that extracts a pixel block on a pixel-by-pixel basis from the three parallax complementary color images that have been generated by the image generating section 7, a degree of shift determining section 44 that determines how much a set of pixel values in each pixel block has shifted from a line, and a magnitude of parallax defining section 46 that defines the magnitude of parallax based on the decision made. The magnitude of parallax d that has been defined on a pixel-by-pixel basis by the magnitude of parallax defining section 46 is output to a distance information generating section 50.

Figure 12:
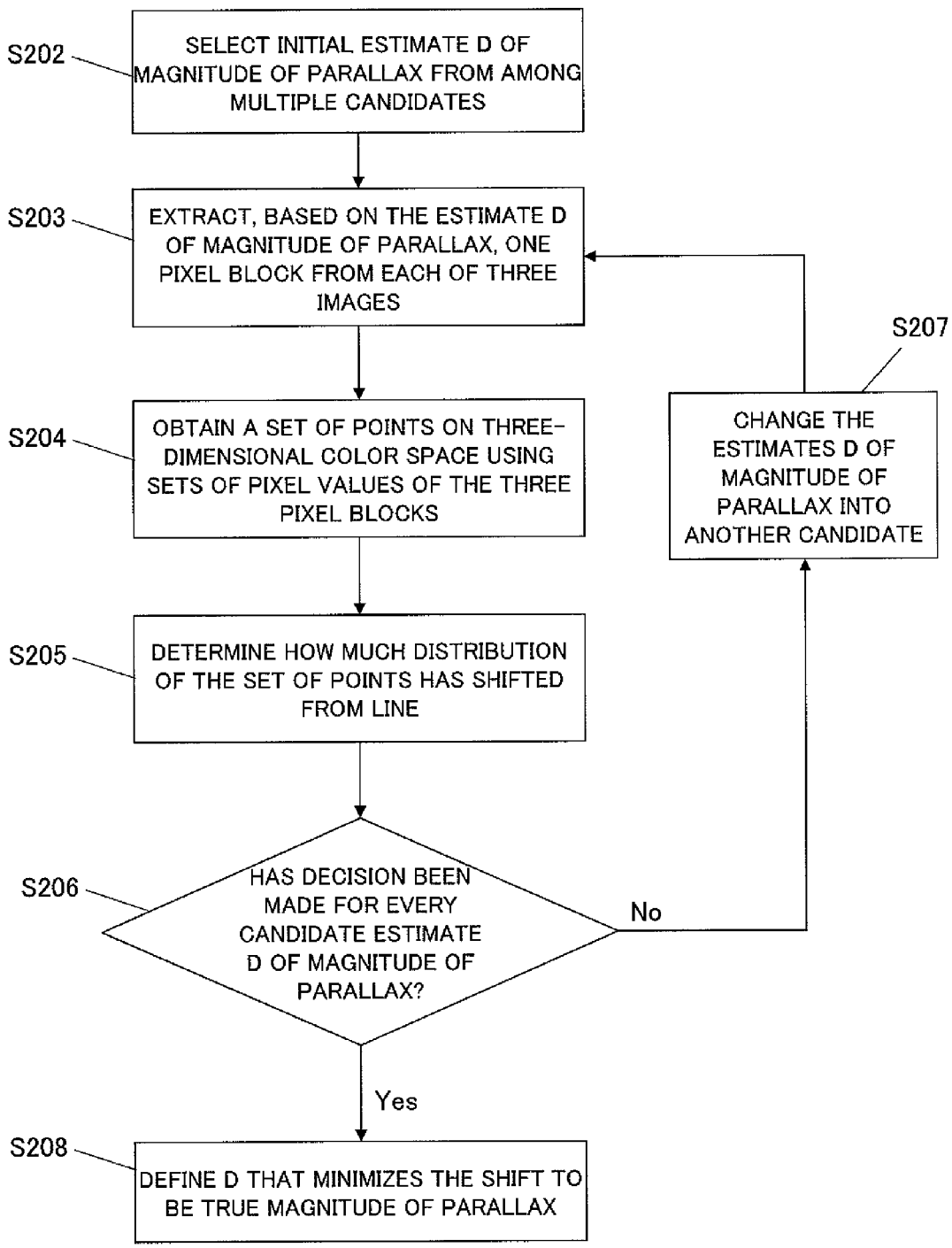
[FIG. 12] A flowchart showing the procedure of estimating the magnitude of parallax according to the first embodiment.

FIG. 12 is a flowchart showing the procedure of the processing to be carried out by the parallax estimating section 40. When three parallax complementary color images are generated by the image generating section 7, the magnitude of parallax is estimated on a pixel-by-pixel basis for each of those images in the following manner. First of all, in Step S202, the pixel block extracting section 42 selects an estimate d of the magnitude of parallax, indicating how many pixels the Cy and Ye images have shifted from the Mg image, from among multiple candidates. Next, in Step S203, the pixel block extracting section 42 extracts, based on the estimate d of the magnitude of parallax, a pixel block from each of the three images. Subsequently, in Step S204, a set of points on a three-dimensional color space is obtained by Equation (17) using the sets of pixel values of the three pixel blocks. Next, in Step S205, the degree of shift determining section 44 determines, by Equation (18), how much the distribution of a set of points on a three-dimensional color space has shifted from the line. Unless the decision has been made for every candidate estimate d of the magnitude of parallax, the estimates d of the magnitude of parallax are changed into another candidate value in Step S207 and the same series of processing steps S203 through S205 are performed all over again. On the other hand, if the decision has been made for every candidate estimate d of the magnitude of parallax, the magnitude of parallax defining section 46 defines in Step S208 d that minimizes the error Er (x, y, d) represented by Equation (18) to be the true magnitude of parallax at the coordinates (x, y). By performing these processing steps on each pixel, the parallax estimating section 40 obtains the parallax between the three parallax complementary color images.

By performing these processing steps, a disparity map of the magnitudes of parallax can be obtained and the distance information can be calculated on a pixel-by-pixel basis. Based on the parallax information that has been obtained by the parallax estimating section 40, the distance information generating section 50 calculates the distance to the subject by Equation (6) on a pixel-by-pixel basis.

As described above, the image capture device of this embodiment captures an image using a light-transmitting plate 2 that is comprised of a Cy area that transmits a light ray falling within the Cy wavelength range, a Ye area that transmits a light ray falling within the Ye wavelength range, and a transparent area made of a transparent member. As a result, multiple images with parallax and a color image can be generated. In addition, by performing the signal processing described above, three complementary color images with parallax can be generated. And by deriving parallax information based on those three complementary color images generated, information about the distance to the subject can be obtained.

Although the image capture device of the embodiment described above generates parallax information and distance information based on three parallax complementary color images, the image capture device may also be configured to generate only parallax information. Also, the processing of generating an image by performing signal arithmetic operations, the parallax information generation processing, and the distance information generation processing may be performed at least partially by another device that is provided independently of that image capture device. For example, even if a signal that has been obtained by an image capture device including the image capturing section 100 of this embodiment is loaded into another device to get a program defining the signal arithmetic processing described above executed by that another device, the effects of the embodiment described above can also be achieved.

Furthermore, although the image generating section of the embodiment described above can generate three parallax complementary color images with parallax and can also generate a monochrome image and a color image with the incoming light used highly efficiently, not all of these images need to be generated. Rather, the image generating section 7 may also be configured to generate three images with parallax to say the least.

In the foregoing description, the transmitting areas of the light-transmitting plate 2 are comprised of a Cy area, a Ye area and a transparent area. However, this particular combination is not necessarily used according to the present invention. Rather even if the Cy and Ye combination is replaced with a Cy and Mg combination or a Mg and Ye combination, pixel signals can also be converted into complementary color image signals by performing similar processing.

Embodiment 2

Next, a second embodiment of the present invention will be described with reference to FIG. 13. The image capture device of this second embodiment is different from the first embodiment described above only in the configuration of the light-transmitting plate 2 and in the method of generating three parallax complementary color images. But in the other respects, the second embodiment is quite the same as the first embodiment. Thus, the following description of the second embodiment will be focused on only those differences and their common features will not be described all over again to avoid redundancies.

Figure 13:
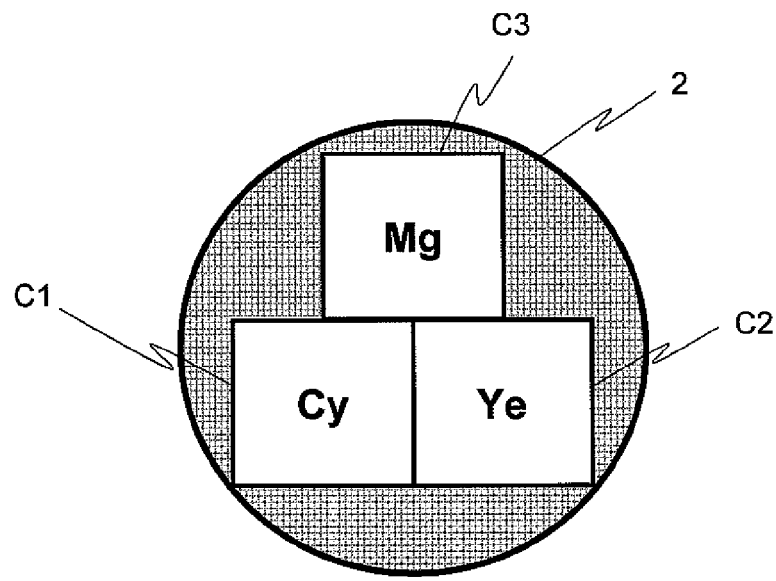
[FIG. 13] A view illustrating an arrangement of transmitting areas on a light-transmitting plate according to a second embodiment.

FIG. 13 is a front view illustrating the configuration of the light-transmitting plate 2 of this embodiment. The light-transmitting plate 2 of this embodiment has a Cy area C1 that transmits a Cy ray, a Ye area C2 that transmits a Ye ray, and a Mg area C3 that transmits a Mg ray. These areas C1, C2 and C3 are implemented as Cy, Ye and Mg filters, respectively. Meanwhile, the rest of the light-transmitting plate 2 other than those areas C1 to C3 is made of an opaque member.

It should be noted that according to this embodiment, the shapes, areas and relative arrangement of those transmitting areas C1, C2 and C3 do not have to be the ones shown in FIG. 13 but may also be determined arbitrarily.

In this embodiment, the spectral transmittances of the respective filters can also be represented as in the first embodiment described above. Specifically, if the spectral transmittance of the Mg filter is identified by Tmg, the signals given by Equations (8), (9) and (10) are represented according to this embodiment by the following Equations (25), (26) and (27), respectively:

$$Rt=Rs/Tw=Ci1\Sigma TcyTr+Ci2\Sigma TyeTr+Ci3\Sigma TmgTr \quad (25)$$

$$Gt=Gs/Tw=Ci1\Sigma TcyTg+Ci2\Sigma TyeTg+Ci3\Sigma TmgTg \quad (26)$$

$$Bt=Bs/Tw=Bt=Ci1\Sigma IcyTb+Ci2\Sigma TyeTb+Ci3\Sigma TmgTb \quad (27)$$

In this embodiment, Gt+Bt−Rt given by the following Equation (28) is also defined to be an image signal Cs representing a Cy component:

$$\begin{aligned}Cs &= Gt + Bt - Rt \\ &= Ci1\left(\sum TcyTg + \sum TcyTb - \sum TcyTr\right) + \\ &\quad Ci2\left(\sum TyeTg + \sum TyeTb - \sum TyeTr\right) + \\ &\quad Ci3\left(\sum TmgTg + \sum TmgTb - \sum TmgTr\right)\end{aligned} \quad (28)$$

In the same way, the signals given by the following Equations (29) and (30) are defined to be image signals Ms and Ys representing Mg and Ye components, respectively:

$$\begin{aligned}Ms &= Rt + Bt - Gt \\ &= Ci1\left(\sum TcyTr + \sum TcyTb - \sum TcyTg\right) + \\ &\quad Ci2\left(\sum TyeTr + \sum TyeTb - \sum TyeTg\right) + \\ &\quad Ci3\left(\sum TmgTr + \sum TmgTb - \sum TmgTg\right)\end{aligned} \quad (29)$$

$$\begin{aligned}Ys &= Rt + Gt - Bt \\ &= Ci1\left(\sum TcyTr + \sum TcyTg - \sum TcyTb\right) + \\ &\quad Ci2\left(\sum TyeTr + \sum TyeTg - \sum TyeTb\right) + \\ &\quad Ci3\left(\sum TmgTr + \sum TmgTg - \sum TmgTb\right)\end{aligned} \quad (30)$$

In this case, as the R, B and G wavelength ranges are hardly covered by the transmission wavelength ranges of the Cy, Ye and Mg filters, respectively, $\Sigma TcyTr \approx \Sigma TyeTb \approx \Sigma TmgTg \approx 0$ is satisfied. Meanwhile, suppose the transmission wavelength range of the Cy filter covers substantially equally the G and B wavelength ranges, the transmission wavelength range of the Ye filter covers substantially equally the G and R wavelength ranges, and the transmission wavelength range of the Mg filter covers substantially equally the R and B wavelength ranges. Then, $\Sigma TcyTg \approx \Sigma TcyTb$, $\Sigma TyeTg \approx \Sigma TyeTr$ and $\Sigma TmgTr \approx \Sigma TmgTb$ are satisfied. Furthermore, the integrated value of the spectral transmittances of the color filters that face the respective pixels of the image sensor 1 is supposed to be the same for every color component. That is to say, $\Sigma Tr \approx \Sigma Tg \approx \Sigma Tg$ is supposed to be satisfied. On these suppositions, Equations (28), (29) and (30) are rewritten into the following Equations (31), (32) and (33), respectively:

$$\begin{aligned}Cs &= Gt + Bt - Rt \\ &= Ci1\left(\sum TcyTg + \sum TcyTb\right)\end{aligned} \quad (31)$$

$$\begin{aligned}Ms &= Rt + Bt - Gt \\ &= Ci3\left(\sum TmgTr + \sum TcyTb\right)\end{aligned} \quad (32)$$

$$\begin{aligned}Ys &= Rt + Gt - Bt \\ &= Ci2\left(\sum TyeTr + \sum TyeTg\right)\end{aligned} \quad (33)$$

Consequently, according to this embodiment, the signals Cs, Ys and Ms representing the three parallax complementary color images correspond to the light rays that have been incident on the areas Ci1, Ci2 and Ci3, respectively. In addition, since each signal is not affected by a component of light that has come from any other area, the magnitude of parallax can be estimated more accurately according to the configuration of this embodiment than in the first embodiment described above.

Embodiment 3

Next, a third embodiment of the present invention will be described with reference to FIG. 14. The image capture device of this third embodiment is different from the first embodiment described above only in the configuration of the light-transmitting plate 2 and in the method of generating three parallax complementary color images. But in the other respects, the third embodiment is quite the same as the first embodiment. Thus, the following description of the third embodiment will be focused on only those differences and their common features will not be described all over again to avoid redundancies.

Figure 14:
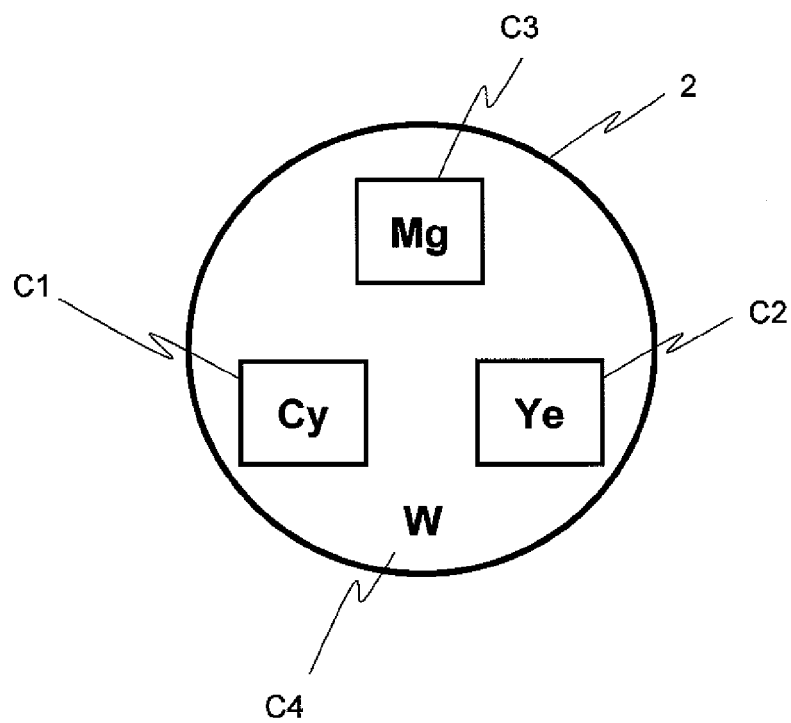
[FIG. 14] A view illustrating an arrangement of transmitting areas on a light-transmitting plate according to a third embodiment.

FIG. 14 is a front view illustrating the configuration of the light-transmitting plate 2 of this embodiment. The light-transmitting plate 2 of this embodiment has a Cy area C1 that transmits a Cy ray, a Ye area C2 that transmits a Ye ray, a Mg area C3 that transmits a Mg ray and a transparent area C4. These areas C1, C2, C3 and C4 are implemented as Cy, Ye and Mg filters and a transparent member, respectively.

According to this embodiment, the light-transmitting plate is divided into those four areas C1, C2, C3 and C4 and signal components Ci1, Ci2, Ci3 and Ci4 represented by the light rays that have been transmitted through those areas C1 through C4 are used. As for the arrangement of those areas, C1 may be arranged at the top of the light-transmitting plate, C2 and C3 may be arranged at lower left and lower right corners, respectively, and the rest of the light-transmitting plate may be C4 as shown in FIG. 14. Parallax in three directions can be obtained by these areas C1, C2 and C3.

With such an arrangement adopted, the signals given by Equations (8), (9) and (10) can be represented according to this embodiment by the following Equations (34), (35) and (36), respectively:

$$Rt=Rs/Tw=Rt=Ci1\Sigma TcyTr+Ci2\Sigma TyeTr+Ci3\Sigma TmgTr+Ci4 \quad (34)$$

$$Gt=Gs/Tw=Gt=Ci1\Sigma TcyTg+Ci2\Sigma TyeTg+Ci3\Sigma TmgTg+Ci4 \quad (35)$$

$$Bt=Bs/Tw=Bt=Ci1\Sigma TcyTb+Ci2\Sigma TyeTb+Ci3\Sigma TmgTb+Ci4 \quad (36)$$

As in the first and second embodiments described above, Equations (34), (35) and (36) can be modified into the following Equations (37), (38) and (39), respectively:

$$Cs=Gt+Bt-Rt=Ci1(\Sigma TcyTg+\Sigma TcyTb)+Ci4 \quad (37)$$

$$Ms=Rt+Bt-Gt=Ci3(\Sigma TmgTr+\Sigma TcyTb)-Ci4 \quad (38)$$

$$Ys=Gt+Rt+Bt=Ci2(\Sigma TyeTg+\Sigma TyeTr)+Ci4 \quad (39)$$

By performing these processing steps, three signals can be obtained by either adding or subtracting a signal $Ci4$ representing a light ray that has been transmitted through the transparent area to/from the signals $Ci1$, $Ci2$ and $Ci3$ representing light rays that have been incident on the areas C1, C2 and C3, respectively.

Figure 15:
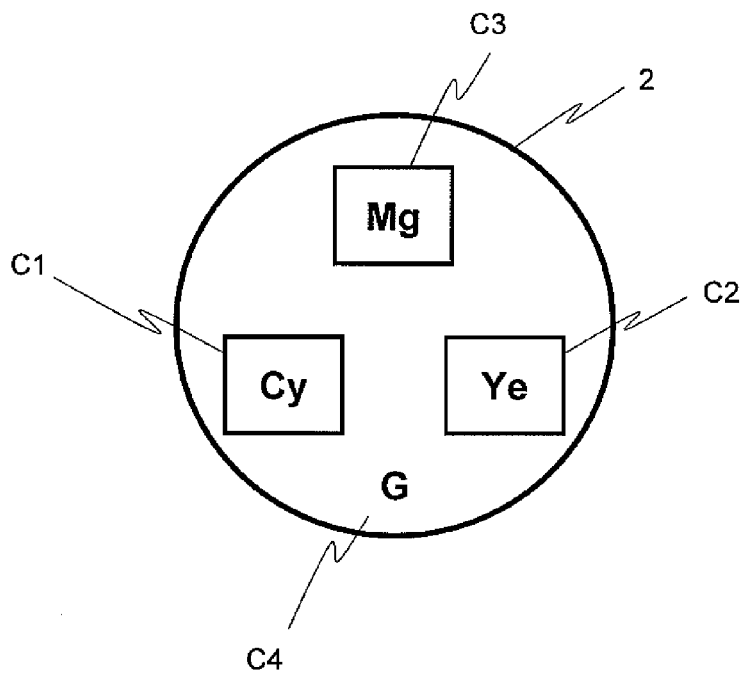
[FIG. 15] A view illustrating another arrangement of transmitting areas on a light-transmitting plate according to the third embodiment.
Figure 16:
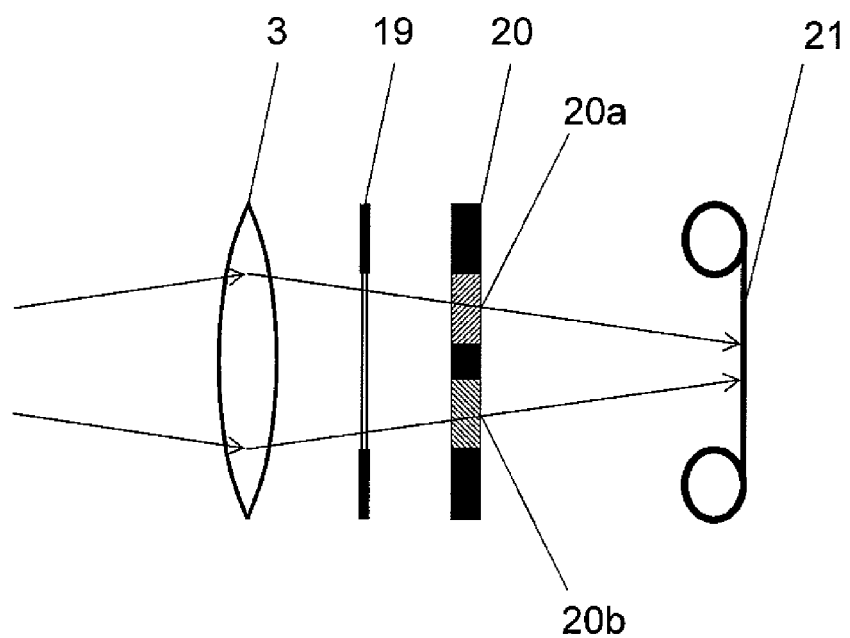
[FIG. 16] A schematic representation illustrating an image capturing system according to Patent Document No. 1.
Figure 17:
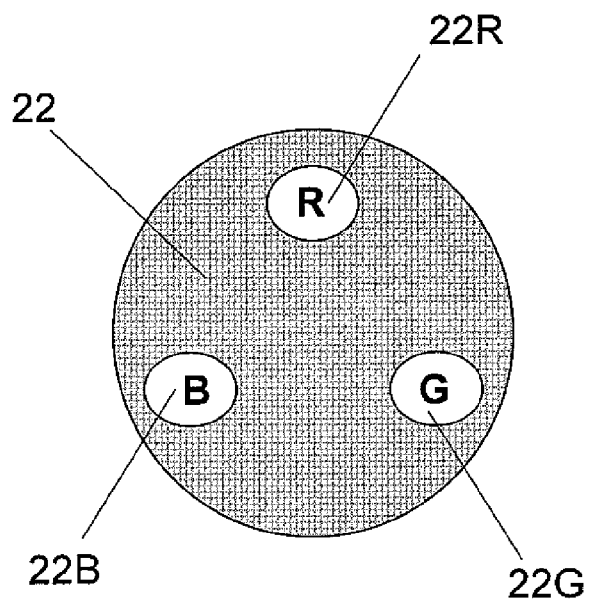
[FIG. 17] A schematic representation illustrating a light beam confining plate according to Patent Document No. 2.
Figure 18:
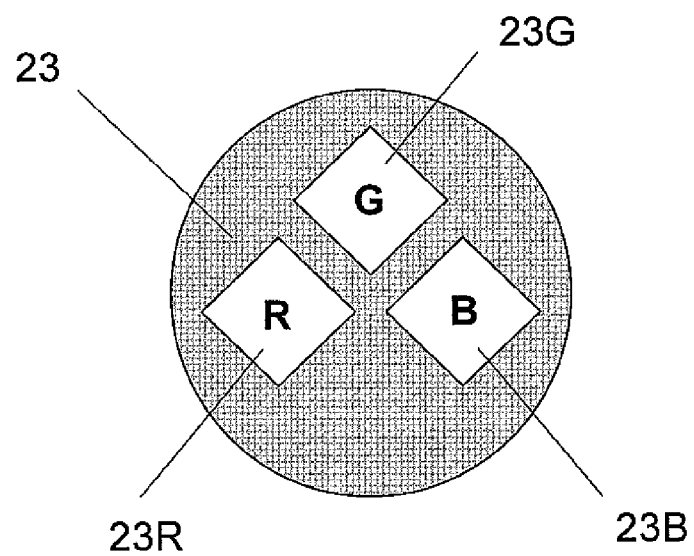
[FIG. 18] A schematic representation illustrating a light beam confining plate according to Patent Document No. 3.

By using the light-transmitting plate 2 of this embodiment, signals representing the light rays that have come from three different directions can be calculated. That is why parallax information based on the color linearity can be obtained with the color shift taken into account in both of the horizontal and vertical directions shown in FIG. 14. As a result, the magnitude of parallax can be estimated more accurately with respect to a line or any other shape with a feature that is difficult to detect or a texture area. On top of that, since the light-transmitting plate has a transparent area, a two-dimensional color image with high sensitivity can also be obtained, which is also beneficial Although the area C4 of this embodiment is a transparent member, a red, green or blue color filter may be arranged in the area C4, too. As an example, a light-transmitting plate 2 in which a green filter is arranged in the area C4 is shown in FIG. 15. Even if such a light-transmitting plate 2 is used, parallax information and depth information can also be obtained by performing similar processing.

In the first through third embodiments described above, the number of transmitting areas in the light-transmitting plate (light-transmitting section) 2 is three or four. However, the light-transmitting section according to the present invention may also have five or more transmitting areas. In any case, as long as those transmitting areas have mutually different transmission wavelength ranges, parallax information can also be obtained by performing similar processing. Also, the direction in which parallax is obtained can be changed into any of various other directions depending on the relative arrangement of those transmitting areas. By determining the best relative arrangement and estimating the parallax according to the texture of a scene shot or the shape or color of the object, the magnitude of parallax can be estimated more accurately.

Also, even though a complementary color filter or a transparent member is arranged in each transmitting area of the light-transmitting plate 2 according to the first through third embodiments described above, a primary color filter may also be arranged in some of the transmitting areas. According to the present invention, any other configuration may be adopted as long as at least one of the transmitting areas either transmits a light ray that falls within one of the cyan, yellow and magenta wavelength ranges or is a transparent member. By using primary color filters and complementary color filters in combination, an image can be captured with filters used in various combinations.

INDUSTRIAL APPLICABILITY

A 3D image capture device according to the present invention can be used effectively in any camera that ever uses a solid-state image sensor. Examples of those cameras include consumer electronic cameras such as digital still cameras and digital camcorders and solid-state surveillance cameras for industrial use.

REFERENCE SIGNS LIST 1 solid-state image sensor
1a imaging area of the solid-state image sensor
2 light-transmitting plate (light-transmitting section)
3 optical lens
4 infrared cut filter
5 signal generating and receiving section
6 sensor driving section
7 image generating section
8 interface section
9 subject
19 lens diaphragm
20, 22, 23 light beam confining plate
20a color filter that transmits red-based ray
20b color filter that transmits blue-based ray
21 photosensitive film
22R, 23R R ray transmitting area of light confining plate
22G, 23G G ray transmitting area of light confining plate
22B, 23B B ray transmitting area of light confining plate
30 memory
40 parallax estimating section
42 pixel block extracting section
44 degree of shift determining section
46 magnitude of shift defining section
50 distance information generating section
60a, 60b, 60c pixel block
100 image capturing section
110 color filter
120 photosensitive cell
200 signal processing section

The invention claimed is:
1. A 3D image capture device comprising:
a light-transmitting plate with first, second and third transmitting areas that have mutually different transmission wavelength ranges, the first and second transmitting areas being surrounded by the third transmitting area, the first transmitting area being made of a member that transmits a light ray falling within one of the cyan, yellow and magenta wavelength ranges, the second transmitting area being made of a member that transmits a light ray falling within another one of the cyan, yellow and magenta wavelength ranges, the third transmitting area being made of a transparent member or a member that transmits a light ray falling within a red, green or blue wavelength range, the third transmitting area being larger than the first and second transmitting areas;
a solid-state image sensor that includes a photosensitive cell array and that is arranged so as to receive the light that has been transmitted through the light-transmitting plate, the photosensitive cell array being made up of a number of unit blocks, each said unit block including R, G and B sensing cells that respectively output first, second and third photoelectrically converted signals representing the quantities of light falling within red, green and blue wavelength ranges, respectively;
an optical system that produces an image on an imaging area of the solid-state image sensor based on the light that has been transmitted through the light transmitting plate; and
a signal processor that processes the output signal of the solid-state image sensor, wherein the signal processor performs processing, including addition and subtraction, on the first, second and third photoelectrically converted signals, thereby generates cyan, yellow and magenta color image signals with parallax, and estimates the parallax between the cyan, yellow and magenta images,
wherein the first photoelectrically converted signal is identified by Rs, the second photoelectrically converted signal is identified by Gs, and the third photoelectrically converted signal is identified by Bs, the signal processor:

generates the cyan color image signal by performing processing including a calculation of (Gs+Bs−Rs);

generates the Yellow color image signal by performing processing including a calculation of (Rs+Gs−Bs); and generates the Magenta color image signal by performing processing including a calculation of (Rs+Bs−Gs);

wherein the light-transmitting plate includes a fourth transmitting area surrounded by the third transmitting area, and the fourth transmitting area is made of a member that transmits a light ray falling within the other one of the cyan, yellow and magenta wavelength ranges.

2. The 3D image capture device of claim 1, wherein the signal processor generates information about a distance to a subject based on the parallax that has been estimated.

3. The 3D image capture device of claim 1, wherein the signal processor:

selects an estimate of the magnitude of parallax from among multiple candidates with respect to each pixel of the cyan, yellow and magenta color images and that extracts, based on the estimate, three pixel blocks of the same size, of which the on-image positions have shifted from each other, from the cyan, yellow and magenta color images;

determines how much the distribution of a set of points on a three-dimensional color space, which is defined by the sets of pixel values of the three pixel blocks, has shifted from a line; and defines the estimate, of which the degree of shift from the line that has been determined turns out to be the minimum, to be the magnitude of parallax at each said pixel.

4. A signal processing method for processing the output signal of an image capture device, the device comprising:

a light-transmitting plate with first, second and third transmitting areas that have mutually different transmission wavelength ranges, the first and second transmitting areas being surrounded by the third transmitting area, the first transmitting area being made of a member that transmits a light ray falling within one of the cyan, yellow and magenta wavelength ranges, the second transmitting area being made of a member that transmits a light ray falling within another one of the cyan, yellow and magenta wavelength ranges, the third transmitting area being made of a transparent member or a member that transmits a light ray falling within a red, green or blue wavelength range, the third transmitting area being larger than the first and second transmitting areas;

a solid-state image sensor that includes a photosensitive cell array and that is arranged so as to receive the light that has been transmitted through the light-transmitting plate, the photosensitive cell array being made up of a number of unit blocks, each said unit block including R, G and B sensing cells that respectively output first, second and third photoelectrically converted signals representing the quantities of light falling within red, green and blue wavelength ranges, respectively; and an optical system that produces an image on an imaging area of the solid-state image sensor based on the light that has been transmitted through the light transmitting plate, the signal processing method comprising:

performing processing, including addition and subtraction, on the first, second and third photoelectrically converted signals, thereby generating cyan, yellow and magenta color image signals with parallax; and estimating the parallax between the cyan, yellow and magenta images, wherein the first photoelectrically converted signal is identified by Rs, the second photoelectrically converted signal is identified by Gs, and the third photoelectrically converted signal is identified by Bs, the generating comprising:

generating the cyan color image signal by performing processing including a calculation of (Gs+Bs−Rs);

generating the Yellow color image signal by performing processing including a calculation of (Rs+Gs−Bs); and generating the Magenta color image signal by performing processing including a calculation of (Rs+Bs−Gs);

wherein the light-transmitting plate includes a fourth transmitting area surrounded by the third transmitting area, and the fourth transmitting area is made of a member that transmits a light ray falling within the other one of the cyan, yellow and magenta wavelength ranges.

5. The signal processing method of claim 4, further comprising generating information about a distance to a subject based on the parallax that has been estimated.

6. The signal processing method of claim 4, wherein the estimating includes:

selecting an estimate of the magnitude of parallax from among multiple candidates with respect to each pixel of the cyan, yellow and magenta color images and extracting, based on the estimate, three pixel blocks of the same size, of which the on-image positions have shifted from each other, from the cyan, yellow and magenta color images;

determining how much the distribution of a set of points on a three-dimensional color space, which is defined by the sets of pixel values of the three pixel blocks, has shifted from a line; and defining the estimate, of which the degree of shift from the line that has been determined turns out to be the minimum, to be the magnitude of parallax at each said pixel.

* * * * *